United States Patent
Khoshnevis et al.

(10) Patent No.: US 9,031,090 B2
(45) Date of Patent: *May 12, 2015

(54) DEVICES FOR SENDING AND RECEIVING FEEDBACK INFORMATION

(71) Applicant: Sharp Laboratories of America, Inc., Camas, WA (US)

(72) Inventors: Ahmad Khoshnevis, Portland, OR (US); Shohei Yamada, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 140 days.

This patent is subject to a terminal disclaimer.

(21) Appl. No.: 13/740,109

(22) Filed: Jan. 11, 2013

(65) Prior Publication Data

US 2014/0198731 A1    Jul. 17, 2014

(51) Int. Cl.
*H04W 72/04* (2009.01)
*H04L 5/00* (2006.01)

(52) U.S. Cl.
CPC .............. *H04W 72/04* (2013.01); *H04L 5/0055* (2013.01)

(58) Field of Classification Search
None
See application file for complete search history.

(56) References Cited

U.S. PATENT DOCUMENTS

| | | | | |
|---|---|---|---|---|
| 8,526,393 | B1 * | 9/2013 | Dinan | 370/330 |
| 2010/0271970 | A1 * | 10/2010 | Pan et al. | 370/252 |
| 2013/0121267 | A1 * | 5/2013 | Koorapaty et al. | 370/329 |
| 2013/0176917 | A1 * | 7/2013 | Lee et al. | 370/280 |
| 2013/0194931 | A1 * | 8/2013 | Lee et al. | 370/241 |
| 2014/0044056 | A1 * | 2/2014 | Chen et al. | 370/329 |
| 2014/0064240 | A1 * | 3/2014 | Dinan | 370/330 |

FOREIGN PATENT DOCUMENTS

WO    2012/109542    8/2012

OTHER PUBLICATIONS

International Search Report issued for International Application No. PCT/JP2014/000096 on Feb. 10, 2014.
LG Electronics, "Aspects on DL and UL Control Channels for HARQ with Enhanced PDCCH," 3GPP TSG-RAN WG1 #67, R1-113921, Nov. 10, 2011.
Alcatel-Lucent Shanghai Bell, Alcatel-Lucent, "PHICH Enhancements," 3GPP TSG-RAN WG1 #67, R1-114067, Nov. 14, 2011.
3GPP TS 36.213 V8.6.0, Evolved Universal Terrestrial Radio Access (E-UTRA); Physical layer procedures (Release 8), Mar. 2009.
3GPP TS 36.212 V9.0.0, Evolved Universal Terrestrial Radio Access (E-UTRA); Multiplexing and channel coding (Release 9), Dec. 2009.

(Continued)

*Primary Examiner* — Kerri Rose
(74) *Attorney, Agent, or Firm* — Austin Rapp & Hardman

(57) ABSTRACT

An evolved Node B (eNB) for sending feedback information is described. The eNB includes a processor and instructions stored in memory that is in electronic communication with the processor. The eNB determines configuration parameters related to an Enhanced Physical Hybrid-Automatic Repeat reQuest (ARQ) Indicator Channel (EPHICH). The eNB also sends an uplink grant and an associated EPHICH resource indicator based on the configuration parameters. The eNB additionally receives data in a Physical Uplink Shared Channel (PUSCH). The eNB further sends Hybrid Automatic Repeat Request Acknowledgement/Negative Acknowledgement (HARQ-ACK) information based on the configuration parameters.

26 Claims, 16 Drawing Sheets

(56) References Cited

OTHER PUBLICATIONS

3GPP TS 36.211 V9.0.0, Evolved Universal Terrestrial Radio Access (E-UTRA); Physical Channels and Modulation (Release 9), Dec. 2009.

3GPP TS 36.331 V9.1.0, Evolved Universal Terrestrial Radio Access (E-UTRA) Radio Resource Control (RRC); Protocol specification (Release 9) Dec. 2009.

* cited by examiner

DEVICES FOR SENDING AND RECEIVING FEEDBACK INFORMATION

TECHNICAL FIELD

The present disclosure relates generally to communication systems. More specifically, the present disclosure relates to devices for sending and receiving feedback information.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and efficiency have been sought. However, improving communication capacity, speed, flexibility and efficiency may present certain problems.

For example, wireless communication devices may communicate with one or more devices using a communication structure. However, the communication structure used may only offer limited flexibility and efficiency. As illustrated by this discussion, systems and methods that improve communication flexibility and efficiency may be beneficial.

DETAILED DESCRIPTION

Figure 1:
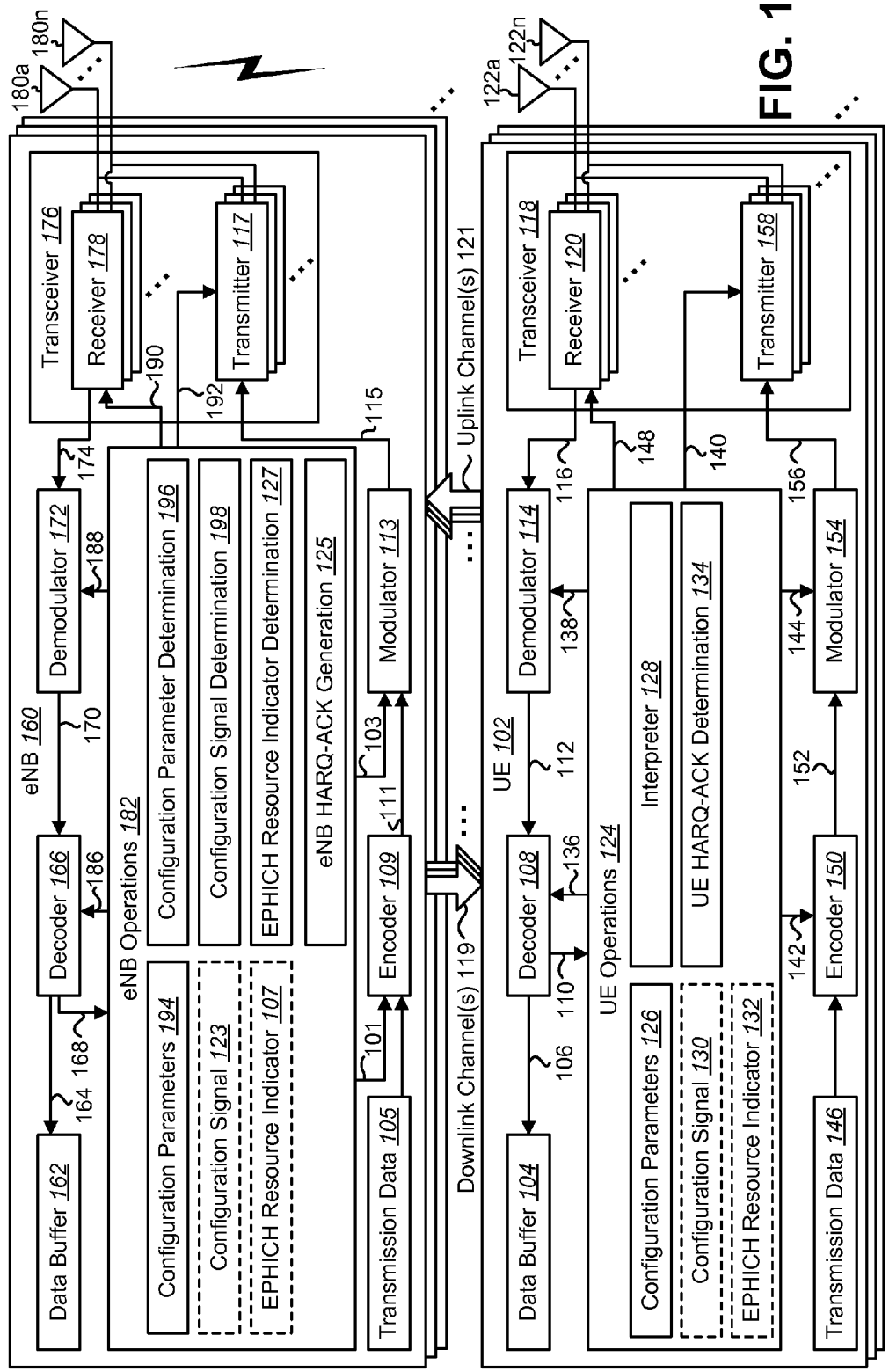
FIG. 1 is a block diagram illustrating one configuration of one or more evolved Node Bs (eNBs) and one or more User Equipments (UEs) in which systems and methods for sending and receiving feedback information may be implemented.

An evolved Node B (eNB) for sending feedback information is described. The eNB includes a processor. The eNB also includes memory in electronic communication with the processor. Instructions stored in the memory are executable to determine configuration parameters related to an Enhanced Physical Hybrid-Automatic Repeat reQuest (ARQ) Indicator Channel (EPHICH). The instructions are also executable to send an uplink grant and an associated EPHICH resource indicator based on the configuration parameters. The instructions are further executable to receive data in a Physical Uplink Shared Channel (PUSCH). The instructions are additionally executable to send Hybrid Automatic Repeat Request Acknowledgement/Negative Acknowledgement (HARQ-ACK) information based on the configuration parameters. The EPHICH resource indicator may include a field in downlink control information (DCI) corresponding to the uplink grant.

At least one of a virtual cell ID (VCID) and a transmit power control (TPC) index may be determined based on the EPHICH group set index. A TPC index may be determined based on the EPHICH resource indicator. At least one of a VCID and an EPHICH group set index may be determined based on the TPC index. There may be multiple virtual cell IDs (VCIDs) configured for demodulation reference signals (DMRS). A single VCID for generating a DMRS sequence may be determined based on the EPHICH resource indicator.

The EPHICH resource indicator may include at least one of a physical resource block (PRB) index and a cyclic shift index. The EPHICH group index may be determined based on at least one of the PRB index and the cyclic shift index. An EPHICH group set index may be determined based on the EPHICH resource indicator. A configuration set index may be determined based on the EPHICH resource indicator.

A User Equipment (UE) for receiving feedback information is also described. The UE includes a processor and memory in electronic communication with the processor. Instructions stored in the memory are executable to receive an uplink grant and an associated EPHICH resource indicator. The instructions are also executable to determine configuration parameters based on the EPHICH resource indicator. The instructions are further executable to send data in a PUSCH. The instructions are additionally executable to obtain HARQ-ACK information based on the configuration parameters.

An EPHICH group set index may be determined based on the EPHICH resource indicator. At least one of a virtual cell ID (VCID) and a transmit power control (TPC) index may be determined based on the EPHICH group set index.

The EPHICH resource indicator may include a field in downlink control information (DCI) corresponding to the uplink grant. An EPHICH group index may be determined based on the EPHICH resource indicator.

A method for sending feedback information by an eNB is also described. The method includes determining configuration parameters related to an EPHICH. The method also includes sending an uplink grant and an associated EPHICH resource indicator based on the configuration parameters. The method further includes receiving data in a PUSCH. The method additionally includes sending HARQ-ACK information based on the configuration parameters.

A method for receiving feedback information by a UE is also described. The method includes receiving an uplink grant and an associated EPHICH resource indicator. The method also includes determining configuration parameters based on the EPHICH resource indicator. The method further includes sending data in a Physical Uplink Shared Channel (PUSCH). The method additionally includes obtaining HARQ-ACK information based on the configuration parameters.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe devices for sending and receiving feedback information. This may be done in the context of an Enhanced Physical Hybrid-Automatic Repeat reQuest (ARQ) Indicator Channel (EPHICH). For example, physical uplink shared channel (PUSCH) Hybrid Automatic Repeat Request Acknowledgement/Negative Acknowledgement (HARQ-ACK) reporting on an EPHICH is described.

In Release 8-11 specifications of 3GPP, a Physical Hybrid-Automatic Repeat reQuest (ARQ) Indicator Channel (PHICH) is used for transmission of HARQ-ACK information to User Equipment (UE). By introducing a new carrier type, the legacy control channels such as PHICH may not be available in future releases of 3GPP, such as Release 12 and beyond. In this disclosure, systems and methods to indicate to the UE the resources used for EPHICH are described.

One benefit of EPHICH for transmission of HARQ-ACK information is that it may indicate to a UE whether the codewords sent from the UE are received at the eNB (e.g., base station, eNode B, etc.) correctly or not. This indication may make adaptive transmission available to the UE. The use of EPHICH may also reduce the overhead of signaling in the downlink by removing the need for transmission of an uplink grant as an implicit indication of a HARQ-ACK signal.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more User Equipments (UEs) 102 in which systems and methods for sending and receiving feedback information may be implemented. The one or more UEs 102 may communicate with one or more eNBs 160 using one or more antennas 122*a-n*. For example, a UE 102 transmits electromagnetic signals to the eNB 160 and receives electromagnetic signals from the eNB 160 using the one or more antennas 122*a-n*. The eNB 160 communicates with the UE 102 using one or more antennas 180*a-n*.

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used. For example, an EPHICH is a downlink channel 119 that may carry HARQ-ACK information corresponding to a PUSCH transmission.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PUSCH transmission data) that may be used by the eNB operations module 182 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the eNB operations module 182 may be implemented in hardware, software or a combination of both.

In general, the eNB operations module 182 may enable the eNB 160 to communicate with the one or more UEs 102. The eNB operations module 182 may include one or more of configuration parameters 194, a configuration parameter determination module 196, a configuration signal determination module 198 and an eNB HARQ-ACK generation module 125. In one implementation, the eNB operations module 182 may include a configuration signal 123. In another implementation, the eNB operations module 182 may include an EPHICH resource indicator 107. In yet another implementation, the eNB operations module 182 may include both a configuration signal 123 and an EPHICH resource indicator 107.

EPHICH time and/or frequency resources may be partitioned by the eNB 160 in several non-overlapping groups. Through the systems and methods described herein, the eNB 160 may indicate (to the UE 102, for instance) the resources used for an EPHICH.

In one implementation, the configuration parameter determination module 196 may determine configuration parameters 194 related to an EPHICH. The configuration parameters 194 may include the resources used for an EPHICH. For example, the configuration parameters 194 may include the time and/or frequency resources and/or scrambling sequence and/or spreading sequence related to an EPHICH. An EPHICH may carry HARQ-ACK information for a PUSCH transmission. Multiple EPHICHs may constitute an EPHICH group. For instance, multiple EPHICHs mapped to the same set of resource elements may constitute an EPHICH group.

As used herein, a resource element is the smallest time and frequency resource unit for uplink and/or downlink transmissions. A physical channel corresponds to a set of resource elements carrying information originating from higher layers and is the interface between the eNB 160 and the UE 102.

One or more EPHICH groups may be included in the configuration parameters 194. An EPHICH group may have an associated EPHICH group index that may be used (by the UE 102 and/or the eNB 160, for instance) to identify that particular EPHICH group.

EPHICH groups may be further associated with one or more EPHICH group sets. The EPHICH group sets may be overlapping (e.g., multiple EPHICH group sets may include one or more of the same EPHICH groups). In one implementation, the configuration of EPHICH group sets may be cell specific (e.g., all UEs 102 are informed about all or the same EPHICH group sets). In another implementation, the configuration of EPHICH group sets may be UE specific (e.g., UEs 102 may be configured with different EPHICH group sets). In yet another implementation, the configuration of one or more EPHICH group sets may be cell specific and the configuration of one or more other EPHICH group sets may be UE specific. An EPHICH group set may have an associated EPHICH group set index that may be used (by the UE 102 and/or the eNB 160, for instance) to identify that particular EPHICH group set. The configuration of the one or more EPHICH group sets may be performed by the configuration parameter determination module 196.

The configuration parameters 194 may additionally include Transmit Power Control (TPC) parameters. The uplink transmit power may be determined by the TPC (also referred to as a TPC loop). The TPC may be static, semi-static and/or dynamically varying (depending on the channel, for instance). The TPC may depend on the long-term and short-term wireless channel between the UE 102 and the reception point (e.g., the eNB 160). The UE 102 may dynamically switch the reception point, and therefore the UE 102 may maintain multiple TPC sets (e.g., one TPC set for each reception point). Dynamic switching between different TPC sets may be done dynamically by transmission of a TPC index in a Downlink Control Information (DCI) field related to an uplink grant (e.g., DCI formats 0 and 4 described below).

The downlink control information is sent in packets of pre-specified length known as Downlink Control Information (DCI). A PDCCH may carry a DCI. DCIs may carry different information. For example, one DCI may be used to inform multiple UEs 102 about downlink resource allocation and another may be used to inform a specific UE 102 about uplink resource allocation, etc. Thus, depending on the functionality of a DCI, different DCIs with different functionality may have different lengths (e.g., bits). A DCI may transport downlink or uplink scheduling information and/or requests for aperiodic channel quality indicator (CQI) reports. It should be noted that a Cyclic Redundancy Check (CRC) may be scrambled based on a Radio Network Temporary Identifier (RNTI). In some configurations, functions such as a multicast control channel (MCCH) change and uplink power control commands for one cell and one RNTI may not be included in the DCI but may be part of other downlink control information.

Different DCIs may be distinguished by the way they are formatted and coded, which may be referred to as DCI formats. A DCI format is a set of fields of DCI. For example, the DCI format 0 may be used for the scheduling of a PUSCH in one uplink (UL) cell. The DCI format 4 is used for the scheduling of a PUSCH in one UL cell with multi-antenna port transmission mode.

The configuration parameters 194 may additionally include information related to one or more demodulation reference signals (DMRS). A DMRS is a reference signal specific to a UE 102. A reference signal is a predefined sequence that is known to both transmitter and the receiver. The receiver, upon reception of the reference signal may perform channel estimation and extract information (e.g., channel state information (CSI), frequency shift, Doppler shift, delay spreading, etc.) that may be used for one or more of demodulation of the accompanying data performing mobility measurement and CSI measurement. One of the parameters that may be used for generating the sequence of a reference signal according to 3GPP specifications is a virtual cell ID (VCID). One VCID may be used for generating a base sequence for DMRS for PUSCH transmission, which also is referred to as a reference signal ID (RSID). For example, there may be multiple virtual cell IDs (VCIDs) configured for demodulation reference signals (DMRS). A single VCID for generating a DMRS sequence may be determined based on the EPHICH resource indicator. Another VCID may be used for generating a cyclic shift.

A cell ID (also referred to as a physical cell ID) may be obtained by the UE 102 indirectly from synchronization signals at the time of cell search and synchronization. A VCID may be configured by the eNB 160 via radio resource control (RRC) signaling and may replace the cell ID in formulas in which the cell ID may be used (e.g., a formula related to deriving the DMRS sequence). One DMRS sequence may be referred to as the base sequence. Several other DMRS sequences can be generated from the base sequence by applying a cyclic shift of the base sequence. Each sequence generated by the cyclic shift of the base sequence can be determined by a cyclic shift index. Therefore, the configuration parameters 194 may include a first VCID for generating the base sequence for DMRS for a PUSCH transmission. For example, there may be multiple virtual cell IDs (VCIDs) configured for demodulation reference signals (DMRS). A single VCID for generating a DMRS sequence may be determined (by the eNB 160 and/or the UE 102) based on the EPHICH resource indicator. The configuration parameters 194 may also include a second VCID for generating the cyclic shift and/or the cyclic shift index for DMRS for a PUSCH transmission.

The configuration parameter determination module 196 may configure one or more sets of configurations for the UE 102. Each set of configurations may include a combination of an EPHICH group set, an EPHICH group set index, an EPHICH group, an EPHICH group index, a first VCID for generating the base sequence for DMRS for a PUSCH transmission, a second VCID for generating the cyclic shift for DMRS for a PUSCH transmission, one or more TPC parameters and a TPC index.

In one implementation, the eNB 160 may indicate the configuration parameters 194 to the UE 102 by higher layer signaling. For example, the eNB 160 may send a configuration signal 123 to the UE 102 that may include higher layer signaling (e.g., System Information (SI) signaling and/or RRC signaling). The configuration signal 123 may include information elements that convey configuration parameters 194 (e.g. one or more sets of configuration parameters). The configuration signal 123 (and the associated information elements) may be broadcast or dedicatedly signaled. The configuration signal 123 may include information elements that are cell specific or UE 102 specific.

The configuration signal 123 may also include an information element that indicates whether EPHICH time and/or frequency resources may be configured or not. In other words, the configuration signal 123 may indicate whether EPHICH may be used in the downlink or not.

The configuration signal 123 may additionally include an information element that indicates at least one of an EPHICH group and an EPHICH group set. As discussed above, the EPHICH group may include multiple EPHICHs mapped to the same set of resource elements, and the EPHICH group set may include one or more EHPICH groups. The configuration signal 123 may include one or more information elements that indicate one or more EPHICH group indexes. The configuration signal 123 may also include one or more information elements that indicate one or more EPHICH group set indexes.

EPHICH resources may be identified similarly to PHICH resources as provided by the following equations. For example, the equations provide an approach for identifying EPHICH resources (e.g., time-frequency resource elements). As described above, an EPHICH may carry the HARQ-ACK. Multiple EPHICHs mapped to the same set of resource elements constitute an EPHICH group, where EPHICHs within the same EPHICH group may be separated through different orthogonal sequences. An EPHICH resource may be identified by the index pair $(n_{EPHICH}^{group}, n_{EPHICH}^{seq})$ where $n_{EPHICH}^{group}$ is the EPHICH group number and $n_{EPHICH}^{seq}$ is the orthogonal sequence index within the group.

For a frame structure type 1, the number of EPHICH groups $N_{EPHICH}^{group}$ is constant in all subframes and given by $N_{EPHICH}^{group} = N_g(N_{RB}^{DL}/8)$ for a normal cyclic prefix and $N_{EPHICH}^{group} = 2 \cdot \lceil N_g(N_{RB}^{DL}/8) \rceil$ for an extended cyclic prefix, where $N_g \in \{1/6, 1/2, 1, 2\}$ may be provided by higher layers (from the eNB 160, for instance). The index $n_{EPHICH}^{group}$ may range from 0 to $N_{EPHICH}^{group} - 1$.

For a frame structure type 2, the number of EPHICH groups may vary between downlink subframes and may be given by $m_i \cdot N_{EPHICH}^{group}$ where $m_i$ is given by Table 1 and $N_{EPHICH}^{group}$ by the expression above. It should be noted that the frame structure type 2 is equivalent to time-division duplexing (TDD). The index $n_{EPHICH}^{group}$ in a downlink subframe with non-zero EPHICH resources may range from 0 to $m_i \cdot N_{EPHICH}^{group} - 1$.

TABLE 1

The factor $m_i$ for a frame structure type 2

| UL-DL configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

For PUSCH transmissions scheduled from serving cell c in subframe n, a UE 102 may determine the corresponding EPHICH resource of serving cell c in subframe n+$k_{EPHICH}$. For frequency-division duplexing (FDD), $k_{EPHICH}$ is always 4. For a TDD scenario, if a UE 102 is configured with one serving cell, or if the UE 102 is configured with more than one serving cell and the TDD uplink-downlink (UL-DL) configuration of all the configured serving cells is the same, for PUSCH transmissions scheduled from serving cell c in subframe n, a UE 102 may determine the corresponding EPHICH resource of serving cell c in subframe n+$k_{EPHICH}$, where $k_{EPHICH}$ is given in Table 2. In another TDD scenario, if a UE 102 is configured with more than one serving cell and the TDD UL-DL configuration of at least two configured serving cells is not the same, for PUSCH transmissions scheduled from serving cell c in subframe n, the UE 102 may determine the corresponding EPHICH resource of serving cell c in subframe n+$k_{EPHICH}$, where $k_{EPHICH}$ is given in Table 2. For a subframe bundling operation, the corresponding EPHICH resource may be associated with the last subframe in the bundle.

TABLE 2

$k_{EPHICH}$ for TDD

| TDD UL-DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

The EPHICH resource may be identified by the index pair ($n_{EPHICH}^{group}$, $n_{EPHICH}^{seq}$) where $n_{EPHICH}^{group}$ is the EPHICH group number and $n_{EPHICH}^{seq}$ is the orthogonal sequence index within the group and may be defined according to Equations (1) and (2).

$$n_{EPHICH}^{group} = (I_{PRB\_RA} + n_{DMRS}) \bmod N_{EPHICH}^{group} + I_{EPHICH} N_{EPHICH}^{group} \quad (1)$$

$$n_{EPHICH}^{seq} = (\lfloor I_{PRB\_RA} / N_{EPHICH}^{group} \rfloor + n_{DMRS}) \bmod 2N_{SF}^{EPHICH} \quad (2)$$

In Equations (1) and (2), $n_{DDMRS}$ may be mapped from the cyclic shift for DMRS field (according to Table 6) in the most recent PDCCH with uplink DCI format 4 for the transport block(s) associated with the corresponding PUSCH transmission. $n_{DMRS}$ may be set to zero, if there is no PDCCH with uplink DCI format for the same transport block, and if the initial PUSCH for the same transport block is semi-persistently scheduled, or if the initial PUSCH for the same transport block is scheduled by the random access response grant. It should be noted that the EPHICH group may identify the EPHICH time and/or frequency resources and is different from the EPHICH resources.

$N_{SF}^{EPHICH}$ is the spreading factor size used for EPHICH modulation. In particular, modulation may be performed in accordance with 3GPP TS 36.211 as described hereafter. The block of bits b(0), . . . , b($M_{bit}$−1) transmitted on one EPHICH in one subframe may be modulated as described in Table 4 below (from Table 7.1.2-1 from 3GPP TS 36.211, for example), resulting in a block of complex-valued modulation symbols z(0), . . . , z($M_s$−1), where $M_s$=$M_{bit}$. In particular, Table 4 illustrates quadrature phase shift keying (QPSK) modulation mapping. In the case of QPSK modulation, pairs of bits, b(i), b(i+1) may be mapped to complex-valued modulation symbols x=I+jQ according to Table 4. Table 3 (from Table 6.9.1-1 from 3GPP TS 36.211, for example) specifies the modulation mappings or schemes applicable for the enhanced physical hybrid ARQ indicator channel.

TABLE 3

| Physical channel | Modulation schemes |
|---|---|
| EPHICH | BPSK |

TABLE 4

| b(i), b(i + 1) | I | Q |
|---|---|---|
| 00 | $1/\sqrt{2}$ | $1/\sqrt{2}$ |
| 01 | $1/\sqrt{2}$ | $-1/\sqrt{2}$ |
| 10 | $-1/\sqrt{2}$ | $1/\sqrt{2}$ |
| 11 | $-1/\sqrt{2}$ | $-1/\sqrt{2}$ |

The block of modulation symbols z(0), . . . , z($M_s$−1) may be symbol-wise multiplied with an orthogonal sequence and scrambled, resulting in a sequence of modulation symbols d(0), . . . , d($M_{symb}$−1) according to $$d(i) = w(i \bmod N_{SF}^{EPHICH}) \cdot (1 - 2c(i)) \cdot z(\lfloor i / N_{SF}^{EPHICH} \rfloor)$$

where $i = 0, \ldots, M_{symb} - 1$ $M_{symb} = N_{SF}^{EPHICH} \cdot M_s$ $N_{SF}^{EPHICH} = \begin{cases} 4 & \text{normal cyclic prefix} \\ 2 & \text{extended cyclic prefix} \end{cases}$ and c(i) is a cell-specific scrambling sequence. The scrambling sequence generator may be initialized with $c_{init} = (\lfloor n_s/2 \rfloor + 1) \cdot (2N_{ID}^{cell} + 1) \cdot 2^9 + N_{ID}^{cell}$ at the start of each subframe. The subframe number is indicated by $n_s$. The orthogonal sequences [w(0) . . . w($N_{SF}^{EPHICH}$−1)] for an EPHICH is given by Table 5 (from Table 6.9.1-2 from 3GPP TS 36.211), where the sequence index $n_{EPHICH}^{seq}$ corresponds to the EPHICH number within the EPHICH group.

TABLE 5

| | Orthogonal sequence | |
|---|---|---|
| Sequence index $n_{EPHICH}^{seq}$ | Normal cyclic prefix $N_{SF}^{EPHICH} = 4$ | Extended cyclic prefix $N_{SF}^{EPHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

In effect, each bit of Ack/Nack to be transmitted on the EPHICH after binary phase shift keying (BPSK) modulation may be multiplied by an appropriate vector in Table 5 and as a result, the bit may be repeated 4 times for normal cyclic prefix and repeated twice (considering the transformation via the vector multiplication) for extended cyclic prefix.

$I_{PRB\_RA}=I_{PRB\_RA}^{lowest\_index}$ for the first transport block of a PUSCH with associated PDCCH or for the case of no associated PDCCH when the number of negatively acknowledged transport blocks is not equal to the number of transport blocks indicated in the most recent PDCCH associated with the corresponding PUSCH, or $I_{PRB\_RA}=I_{PRB\_RA}^{lowest\_index}+1$ for a second transport block of a PUSCH with associated PDCCH. $I_{PRB\_RA}^{lowest\_index}$ is the lowest physical resource block (PRB) index in the first slot of the corresponding PUSCH transmission. $N_{EPHICH}^{group}$ is the number of EPHICH groups configured by higher layers as described above. $I_{EPHICH}=1$ for TDD UL-DL configuration with PUSCH transmission in subframe n=4 or 9, or $I_{EPHICH}=0$ otherwise.

TABLE 6

| Cyclic Shift for DMRS Field in PDCCH with uplink DCI format in 3GPP TS 36.212 | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

The configuration signal 123 may additionally include linkages between configuration parameters 194. For example, a linkage between items A and B represents a dependency between A and B. The dependency may have various forms. In one implementation, the value of B may be identified from a lookup table based on the value of A. In another implementation, the value of B may be identified from a formula that takes at least the value of A as an input parameter. In yet another implementation, an information element in which A is configured includes a parameter that takes its value from the value of B that is stored in the information element in which B is configured.

One linkage that may be included in the configuration signal 123 may be between one EPHICH group set and one or more EPHICH groups or a list of EPHICH groups. In other words, the configuration signal 123 may indicate a dependency between one EPHICH group set and one or more EPHICH groups.

Another linkage may be between an EPHICH group and an EPHICH group set. Yet another linkage may be between an EPHICH group set and a DMRS setting (e.g., a first VCID for generating the base sequence for DMRS for a PUSCH transmission and/or a second VCID for generating the cyclic shift for DMRS for a PUSCH transmission). Another linkage may be between an EPHICH group set and a TPC index. Yet another linkage may be between a VCID (e.g., a DMRS setting) and a TPC index.

In some configurations, higher layer signaling, such as Radio Resource Control (RRC) signaling, may configure whether the EPHICH is enabled or not. For example, the eNB 160 may send RRC signaling to a UE 102 to configure an EPHICH. In one implementation, if an EPHICH is configured, the eNB 160 may send an EPHICH resource indicator 107 to one or more UEs 102. The EPHICH resource indicator 107 may be used instead of or in addition to the configuration signal 123. The eNB operations module 182 may include an EPHICH resource indicator determination module 127. The EPHICH resource indicator determination module 127 may generate the EPHICH resource indicator 107 based on the configuration parameters 194. In one implementation, the EPHICH resource indicator 107 may be a field in a DCI corresponding to an uplink grant. The uplink grant may be sent from the eNB 160 to the UE 102 to schedule a transmission on the uplink channel 121. The length of the field in the DCI may be, for example, one to five bits (e.g., DCI bits). The DCI bits may be added to one or more DCI formats for an uplink grant.

The DCI bits included in the EPHICH resource indicator 107 may be used to indicate various resource parameters. In one implementation, the DCI bits may be used (by the UE 102, for instance) to determine an EPHICH group set index. Upon determining the EPHICH group set index, at least one of a VCID and a TPC index may be determined based on the EPHICH group set index. The DCI bits may be used to determine either or both of a first VCID for generating the base sequence for DMRS for a PUSCH transmission and/or a second VCID for generating the cyclic shift for DMRS for a PUSCH transmission.

In another implementation, the DCI bits may be used to determine a TPC index. Upon determining the TPC index, at least one of a VCID and an EPHICH group set index may be determined based on the TPC index. The TPC index may be used to determine either or both of a first VCID for generating the base sequence for DMRS for a PUSCH transmission and/or a second VCID for generating the cyclic shift for DMRS for a PUSCH transmission.

In yet another implementation, the DCI bits may be used to determine one or more VCIDs. The DCI bits may be used to determine either or both of a first VCID for generating the base sequence for DMRS for a PUSCH transmission and/or a second VCID for generating the cyclic shift for DMRS for a PUSCH transmission. Upon determining the one or more VCIDs, at least one of a TPC index and an EPHICH group set index may be determined based on the one or more VCIDs.

The DCI bits may also identify an EPHICH group index. Therefore, the DCI bits included in the EPHICH resource indicator 107 may indicate both the EPHICH group index and the EPHICH group set index. As described above, the EPHICH group index may be determined based on one or more of a PUSCH physical resource block (PRB) number, a cyclic shift index for PUSCH DMRS and an nDMRS parameter (e.g., $n_{DMRS}$ as described above).

The DCI bits may also identify a configuration set index. A configuration set may include a combination of one EPHICH group set, one TPC index and a VCID. Therefore, by indicating a configuration set, the DCI bits may indicate an associated EPHICH group set, TPC index and a VCID. The configuration set is discussed in more detail in connection with FIG. 11 below.

The eNB HARQ-ACK generation module 125 may generate HARQ-ACK information based on data received in a PUSCH transmission. For example, the eNB 160 may receive data in a PUSCH transmission from the UE 102. The eNB HARQ-ACK generation module 125 may generate HARQ-ACK information based on whether a signal (e.g., data) in the PUSCH was correctly received or not. The eNB 160 may receive one or more codewords in a PUSCH transmission from the UE 102. Therefore, the eNB HARQ-ACK generation module 125 may generate HARQ-ACK information corresponding to each codeword. The eNB HARQ-ACK generation module 125 may generate an Acknowledgement (ACK) bit for each packet that is correctly received in a PUSCH transmission. However, the eNB HARQ-ACK generation module 125 may generate a Negative Acknowledgement (NACK) bit for each packet that is not correctly received in a PUSCH transmission. In one implementation, the HARQ-ACK information may be transmitted on an EPHICH.

Upon determining the HARQ-ACK information, the eNB HARQ-ACK generation module 125 may send the HARQ-ACK information based on the configuration parameters 194. For example, the eNB HARQ-ACK generation module 125 may send the HARQ-ACK information to the UE 102 using the resources indicated by the configuration signal 123 and/or the EPHICH resource indicator 107. One or more EPHICHs may be sent to the UE 102 corresponding to each codeword received in a PUSCH transmission from the UE 102. The one or more EPHICHs may be included in an EPHICH group. The one or more EPHICH groups may be included in an EPHICH group set.

The configuration signal 123 and EPHICH resource indicator 107 may be sent before an EPHICH transmission. For example, the eNB 160 may send the EPHICH resource indicator 107 with an uplink grant. At a later time, the eNB 160 may receive the PUSCH transmission based on the uplink grant and may send an EPHICH using the resources indicated by the configuration signal 123 and/or the EPHICH resource indicator 107. Therefore, the configuration signal 123 and/or the EPHICH resource indicator 107 may be transmitted in advance of the transmission of the EPHICH.

The eNB operations module 182 may provide information 190 to the one or more receivers 178. For example, the eNB operations module 182 may inform the receiver(s) 178 when or when not to receive transmissions based on the configuration parameters 194.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101. The other information 101 may include the configuration signal 123, the EPHICH resource indicator 107 and the HARQ-ACK information generated by the eNB HARQ-ACK generation module 125.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

In general, the UE operations module 124 may enable the UE 102 to communicate with the one or more eNBs 160. The UE operations module 124 may include one or more of configuration parameters 126, an interpreter module 128 and a UE HARQ-ACK determination module 134. In one implementation, the UE operations module 124 may include a configuration signal 130. In another implementation, the UE operations module 124 may include an EPHICH resource indicator 132. In yet another implementation, the UE operations module 124 may include both a configuration signal 130 and an EPHICH resource indicator 132.

In one implementation, the UE 102 may receive a configuration signal 130 related to an EPHICH. The configuration signal 130 received by the UE 102 may be the configuration signal 123 sent by the eNB 160. In another implementation, the UE 102 may receive an EPHICH resource indicator 107. The EPHICH resource indicator 107 received by the UE 102 may be the EPHICH resource indicator 107 sent by the eNB 160. The EPHICH resource indicator 107 may be associated with an uplink grant from the eNB 160.

The interpreter module 128 may determine configuration parameters 126 based on the configuration signal 130 and/or the EPHICH resource indicator 132. In one implementation, the interpreter module 128 may determine the configuration parameters 126 based only on the configuration signal 130. In another implementation, the interpreter module 128 may determine the configuration parameters 126 based only on the EPHICH resource indicator 132. In yet another implementation, the interpreter module 128 may determine the configuration parameters 126 based on a combination of the configuration signal 130 and the EPHICH resource indicator 132.

The configuration parameters 126 may indicate the resources used for an EPHICH. The configuration parameters 126 may be similar to the configuration parameters 194 determined by the eNB operations module 182. For example, the configuration parameters 126 may include the information about the time and frequency resources related to an EPHICH determined by the eNB operations module 182. The configuration parameters 126 may include one or more EPHICH groups with associated EPHICH group indexes. The configuration parameters 126 may also include one or more EPHICH group sets with associated EPHICH group set indexes. Additionally, the configuration parameters 126 may include a first VCID for generating the base sequence for DMRS for a PUSCH transmission, a second VCID for generating the cyclic shift for DMRS for a PUSCH transmission, one or more TPC parameters and a TPC index as described above.

The UE 102 may send data in a PUSCH transmission. The UE 102 may send the data to the eNB 160 based on the uplink grant received from the eNB 160. The UE 102 may include one or more codewords in the PUSCH transmission that may be used by the eNB 160 for generating HARQ-ACK information. The HARQ-ACK information may be included in an EPHICH sent by the eNB 160 to the UE 102.

The UE HARQ-ACK determination module 134 may obtain HARQ-ACK information based on the configuration parameters 126. For example, the configuration parameters 126 may indicate the resources used for EPHICH transmission. Using these resources, the UE 102 may receive one or more EPHICHs. The UE HARQ-ACK determination module 134 may decode the information included in the one or more EPHICHs based on the resources that are indicated in the configuration parameters 126 to obtain the HARQ-ACK information. The HARQ-ACK information may indicate whether the data sent in the PUSCH transmission was successfully received by the eNB 160 or not. If the HARQ-ACK information indicates that the data was not received by the eNB 160 (e.g., if the EPHICH is NACK), the UE 102 may resend the data in a PUSCH transmission to the eNB 160.

The UE operations module 124 may provide information 148 to the one or more receivers 120. For example, the UE operations module 124 may inform the receiver(s) 120 when or when not to receive transmissions based on the uplink grant.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include the data to be sent in a PUSCH transmission or retransmission in the event that the HARQ-ACK information indicates that the data transmission was not successfully received by the eNB 160.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
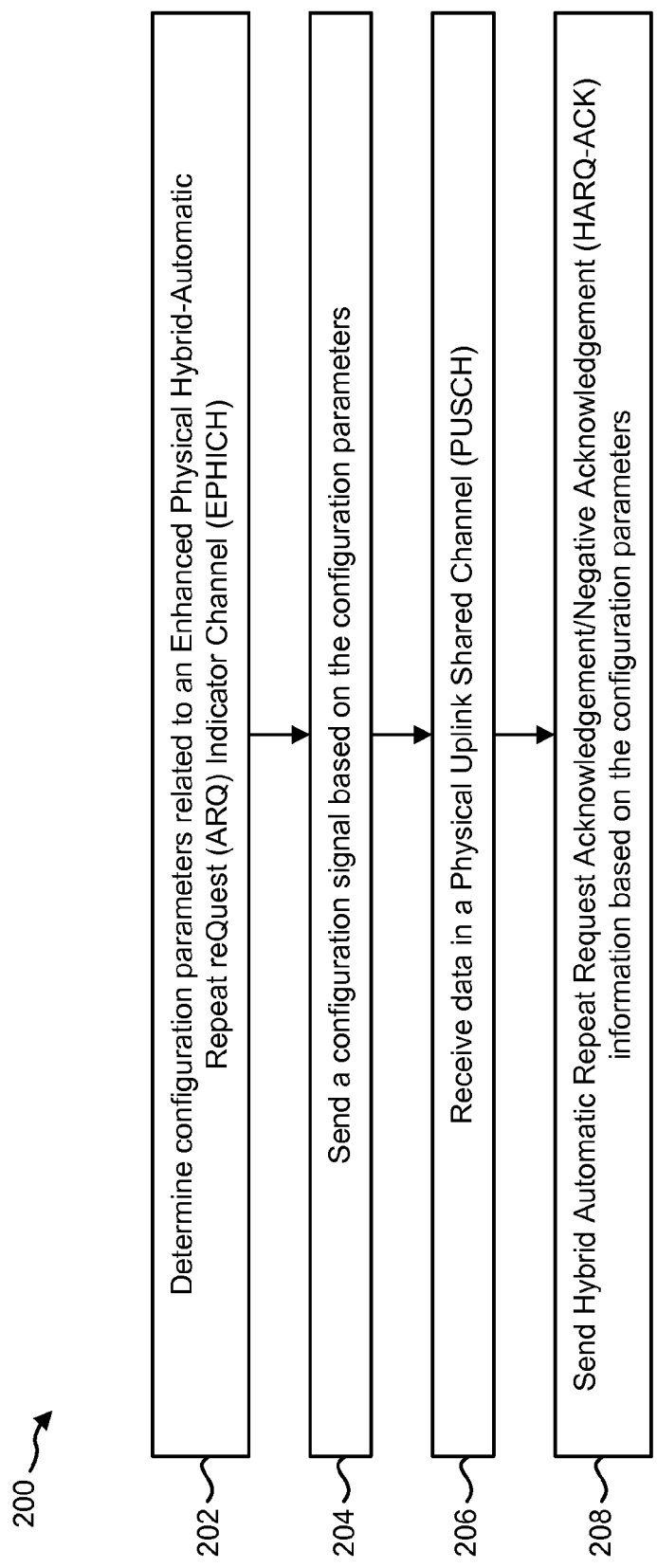
FIG. 2 is a flow diagram illustrating one implementation of a method for sending feedback information.

FIG. 2 is a flow diagram illustrating one implementation of a method 200 for sending feedback information. An eNB 160 may determine 202 configuration parameters 194 related to an EPHICH. For example, the configuration parameters 194 may indicate the resources (including a combination of time, frequency, spatial layer, code, scrambling or spreading sequence resources) used for an EPHICH. The configuration parameters 194 may include information about the time and frequency resources related to an EPHICH. The configuration parameters 194 may include one or more EPHICH groups with associated EPHICH group indexes. The configuration parameters 194 may also include one or more EPHICH group sets with associated EPHICH group set indexes. Additionally, the configuration parameters 194 may include a first VCID for generating the base sequence for DMRS for a PUSCH transmission, a second VCID for generating the cyclic shift for DMRS for a PUSCH transmission, one or more TPC parameters and a TPC index as described above in connection with FIG. 1.

The eNB 160 may send 204 a configuration signal 123 based on the configuration parameters 194. In one implementation, the configuration signal 123 may include higher layer signaling (e.g., SI and/or RRC signaling). The configuration signal 123 may convey the configuration parameters 194 to the UE 102. For example, the configuration signal 123 may include an information element that indicates whether EPHICH time and/or frequency resources may be configured or not. The configuration signal 123 may also include an information element that indicates one or more EPHICH groups and associated EPHICH group indexes. The configuration signal 123 may additionally include one or more information elements that indicate one or more EPHICH group sets and associated EPHICH group set indexes. In some implementations, the configuration signal 123 may indicate that the EPHICH is configured.

The configuration signal 123 may additionally include linkages between configuration parameters 194. One linkage that may be included in the configuration signal 123 may be between one EPHICH group set and one or more EPHICH groups or a list of EPHICH groups. Another linkage may be between an EPHICH group and an EPHICH group set. Another linkage may be between an EPHICH group set and a VCID (e.g., a first VCID for generating the base sequence for DMRS for a PUSCH transmission and/or a second VCID for generating the cyclic shift for DMRS for a PUSCH transmission). Another linkage may be between an EPHICH group set and a TPC index. Yet another linkage may be between a VCID (e.g., a DMRS setting) and a TPC index.

The eNB 160 may receive 206 data in a PUSCH. The data may be received 206 from a UE 102. The PUSCH transmission may be scheduled by the eNB 160 through an uplink grant sent to the UE 102.

The eNB 160 may send 208 HARQ-ACK information based on the configuration parameters 194. For example, the eNB 160 may send 208 the HARQ-ACK information to the UE 102 using the resources indicated by the configuration signal 123. The HARQ-ACK information may be included in an EPHICH. One or more EPHICHs may be sent 208 to the UE 102 that correspond to codeword(s) received in a PUSCH transmission from the UE 102. The one or more EPHICHs may be included in an EPHICH group. The one or more EPHICH groups may be included in an EPHICH group set.

Figure 3:
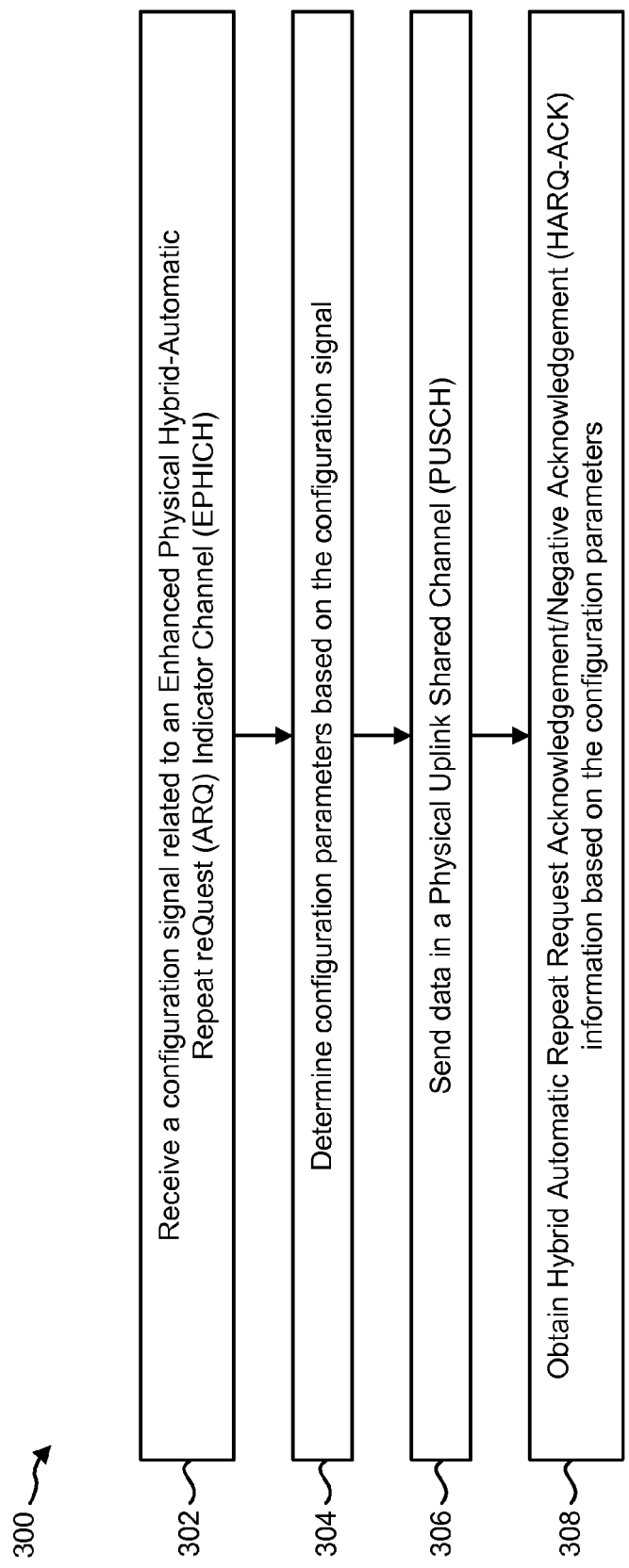
FIG. 3 is a flow diagram illustrating one implementation of a method for receiving feedback information.

FIG. 3 is a flow diagram illustrating one implementation of a method 300 for receiving feedback information. A UE 102 may receive 302 a configuration signal 130 related to an EPHICH. For example, the configuration signal 130 received by the UE 102 may be sent by an eNB 160. The configuration signal 130 may include higher layer signaling. In some implementations, the configuration signal 123 may indicate that the EPHICH is configured.

The UE 102 may determine 304 configuration parameters 126 based on the configuration signal 130. The configuration parameters 126 may indicate the resources used for an EPHICH. For example, the configuration parameters 126 may include information about the time and frequency resources related to an EPHICH. The configuration parameters 126 may include one or more EPHICH groups with associated EPHICH group indexes. The configuration parameters 126 may also include one or more EPHICH group sets with associated EPHICH group set indexes. Additionally, the configuration parameters 126 may include a first VCID for generating the base sequence for DMRS for a PUSCH transmission, a second VCID for generating the cyclic shift for DMRS for a PUSCH transmission, one or more TPC parameters and a TPC index as described above in connection with FIG. 1.

The UE 102 may send 306 data in a PUSCH. The UE 102 may send 306 the data to the eNB 160 based on an uplink grant received from the eNB 160. The UE 102 may include one or more codewords in the PUSCH transmission that may be used by the eNB 160 for generating HARQ-ACK information. The HARQ-ACK information may be included in an EPHICH sent by the eNB 160 to the UE 102.

The UE 102 may obtain 308 HARQ-ACK information based on the configuration parameters 126. For example, the configuration parameters 126 may indicate the resources used for the EPHICH transmission. Using these resources, the UE 102 may receive one or more EPHICHs. Therefore, the UE 102 may decode the information included in the one or more EPHICHs based on the resources that are indicated in the configuration parameters 126 to obtain 308 the HARQ-ACK information. The HARQ-ACK information may indicate whether the data sent 306 in the PUSCH transmission was successfully received by the eNB 160 or not. The UE 102 may resend the data in a PUSCH transmission if the HARQ-ACK information indicates that the data was not successfully received by the eNB 160.

Figure 4:
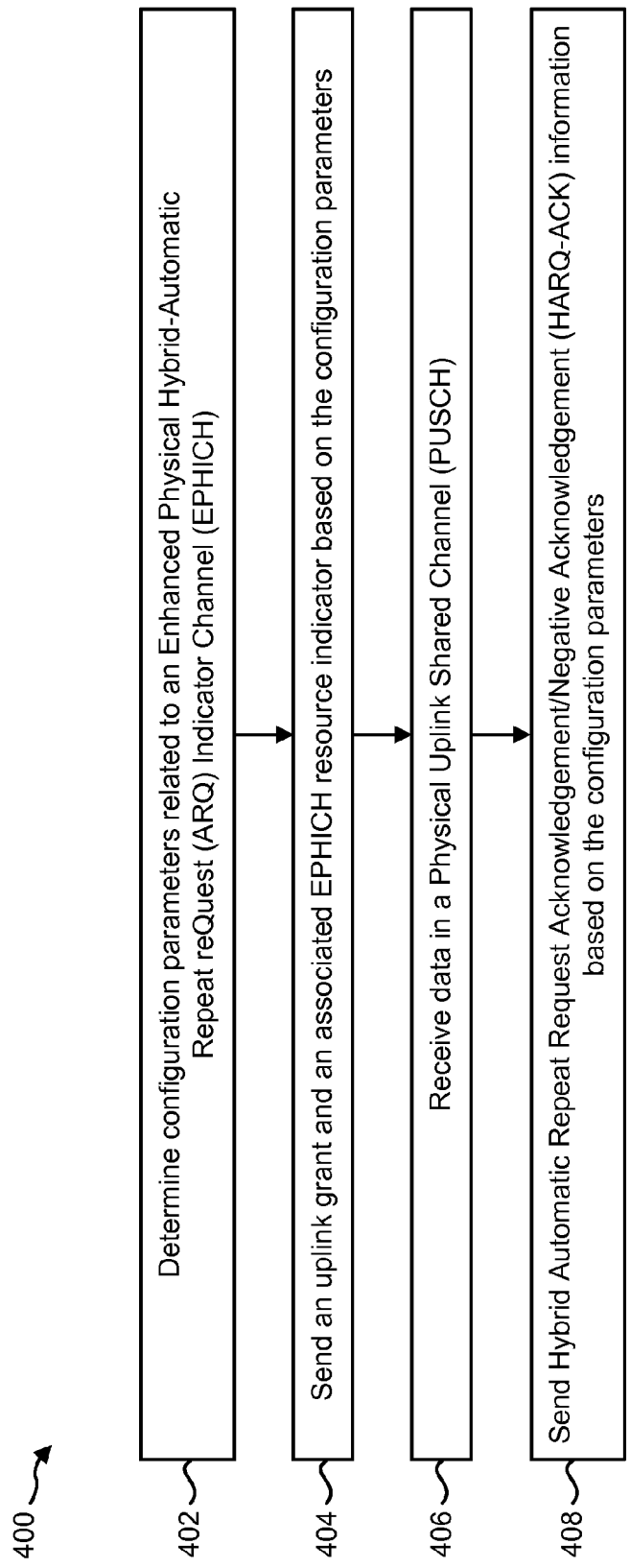
FIG. 4 is a flow diagram illustrating another implementation of a method for sending feedback information.

FIG. 4 is a flow diagram illustrating another implementation of a method 400 for sending feedback information. An eNB 160 may determine 402 configuration parameters 194 related to an EPHICH. This may be done as described above in connection with FIG. 2.

The eNB 160 may send 404 an uplink grant and an associated EPHICH resource indicator 107 based on the configuration parameters 194. For example, eNB 160 may generate the EPHICH resource indicator 107 based on the configuration parameters 194. In one implementation, the EPHICH resource indicator 107 may be a field in a DCI corresponding to an uplink grant. The uplink grant may be sent 404 from the eNB 160 to the UE 102 to schedule a transmission on the uplink channel 121.

The EPHICH resource indicator 107 may convey the configuration parameters 194 to the UE 102. For example, the EPHICH resource indicator 107 may indicate one or more EPHICH group and associated EPHICH group indexes. The EPHICH resource indicator 107 may additionally indicate one or more EPHICH group sets and associated EPHICH group set indexes. The EPHICH group index may be indicated based on one or more of a PUSCH physical resource block (PRB) number, a cyclic shift index for PUSCH DMRS and an nDMRS parameter.

The EPHICH resource indicator 107 may also indicate various dependencies between resource parameters. In one implementation, the EPHICH resource indicator 107 may indicate (to the UE 102, for instance) an EPHICH group set index. At least one of a VCID and a TPC index may be determined based on a linkage to the EPHICH group set index. The EPHICH resource indicator 107 may be used to determine either or both of a first VCID for generating the base sequence for DMRS for a PUSCH transmission and/or a second VCID for generating the cyclic shift for DMRS for a PUSCH transmission.

In another implementation, the EPHICH resource indicator 107 may indicate a TPC index. At least one of a VCID and an EPHICH group set index may be determined based on a linkage to the TPC index. The TPC index may be used to determine either or both of a first VCID for generating the base sequence for DMRS for a PUSCH transmission and/or a second VCID for generating the cyclic shift for DMRS for a PUSCH transmission.

In yet another implementation, the EPHICH resource indicator 107 may indicate one or more VCIDs. The EPHICH resource indicator 107 may indicate either or both of a first VCID for generating the base sequence for DMRS for a PUSCH transmission and/or a second VCID for generating the cyclic shift for DMRS for a PUSCH transmission. At least one of a TPC index and an EPHICH group set index may be determined based on a linkage to the one or more VCIDs.

The EPHICH resource indicator 107 may also indicate a configuration set. A configuration set may include one EPHICH group set, one TPC index and a VCID. Therefore, by indicating a configuration set, the EPHICH resource indicator 107 may indicate an associated EPHICH group set, TPC index and a VCID.

The eNB 160 may receive 406 data in a PUSCH. The data may be received 406 from a UE 102. The PUSCH transmission may be scheduled by the eNB 160 through an uplink grant sent to the UE 102.

The eNB 160 may send 408 HARQ-ACK information based on the configuration parameters 194. This may be done as described above in connection with FIG. 2.

Figure 5:
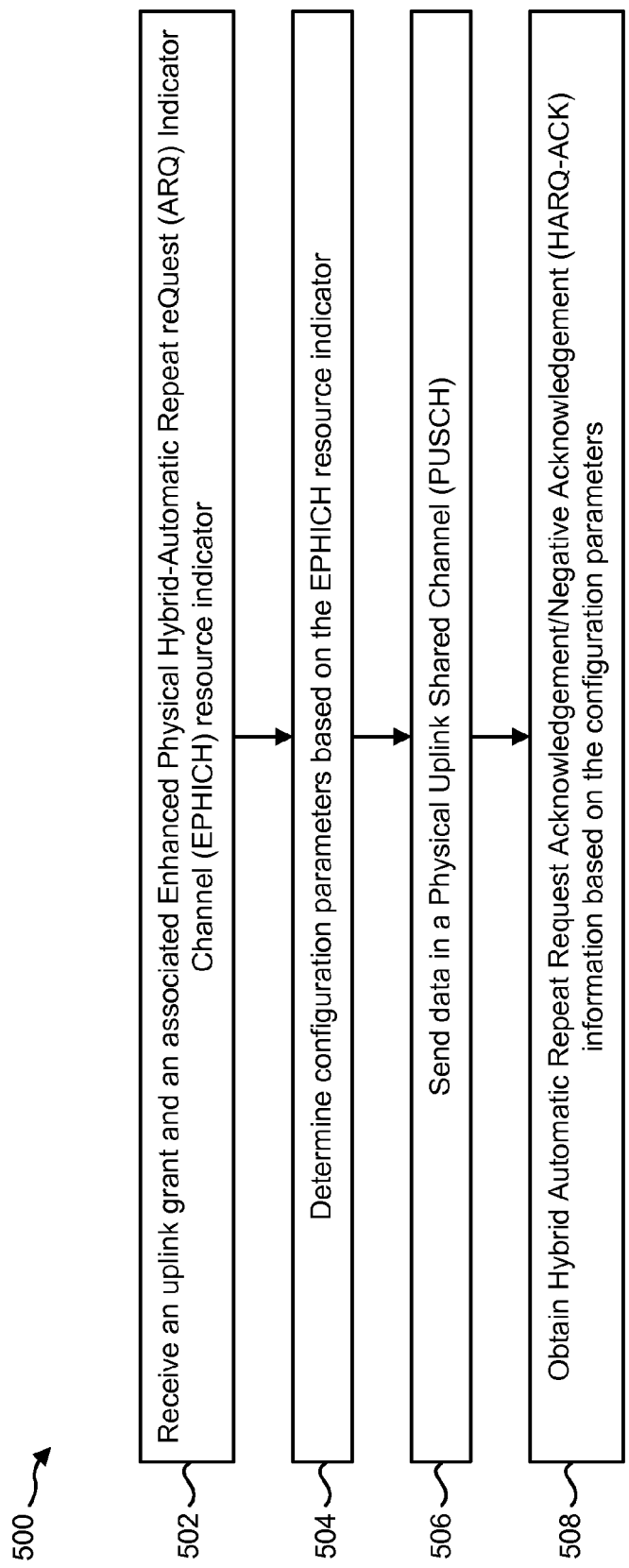
FIG. 5 is a flow diagram illustrating another implementation of a method for receiving feedback information.

FIG. 5 is a flow diagram illustrating another implementation of a method 500 for receiving feedback information. A UE 102 may receive 502 an uplink grant and an associated EPHICH resource indicator 132. For example, the EPHICH resource indicator 132 may be generated (by an eNB 160, for instance) as described above in connection with FIG. 4. In one implementation, the EPHICH resource indicator 132 may be a field in a DCI corresponding to the uplink grant. The uplink grant may be sent from the eNB 160 to the UE 102 to schedule a transmission on the uplink channel 121.

The UE 102 may determine 504 configuration parameters 126 based on the EPHICH resource indicator 132. The EPHICH resource indicator 132 may convey the configuration parameters 126 to the UE 102 as described above in connection with FIG. 4.

The configuration parameters 126 may indicate the resources used for an EPHICH. The configuration parameters 126 may include information about the time and frequency resources related to an EPHICH. For example, the configuration parameters 126 may include one or more EPHICH groups with associated EPHICH group indexes. The configuration parameters 126 may also include one or more EPHICH group sets with associated EPHICH group set indexes. Additionally, the configuration parameters 126 may include a first VCID for generating the base sequence for DMRS for a PUSCH transmission, a second VCID for generating the cyclic shift for DMRS for a PUSCH transmission, one or more TPC parameters and a TPC index as described above in connection with FIG. 1.

The UE 102 may send 506 data in a PUSCH. This may be accomplished as described above in connection with FIG. 3.

The UE 102 may obtain 508 HARQ-ACK information based on the configuration parameters 126. This may be accomplished as described above in connection with FIG. 3.

Figure 6:
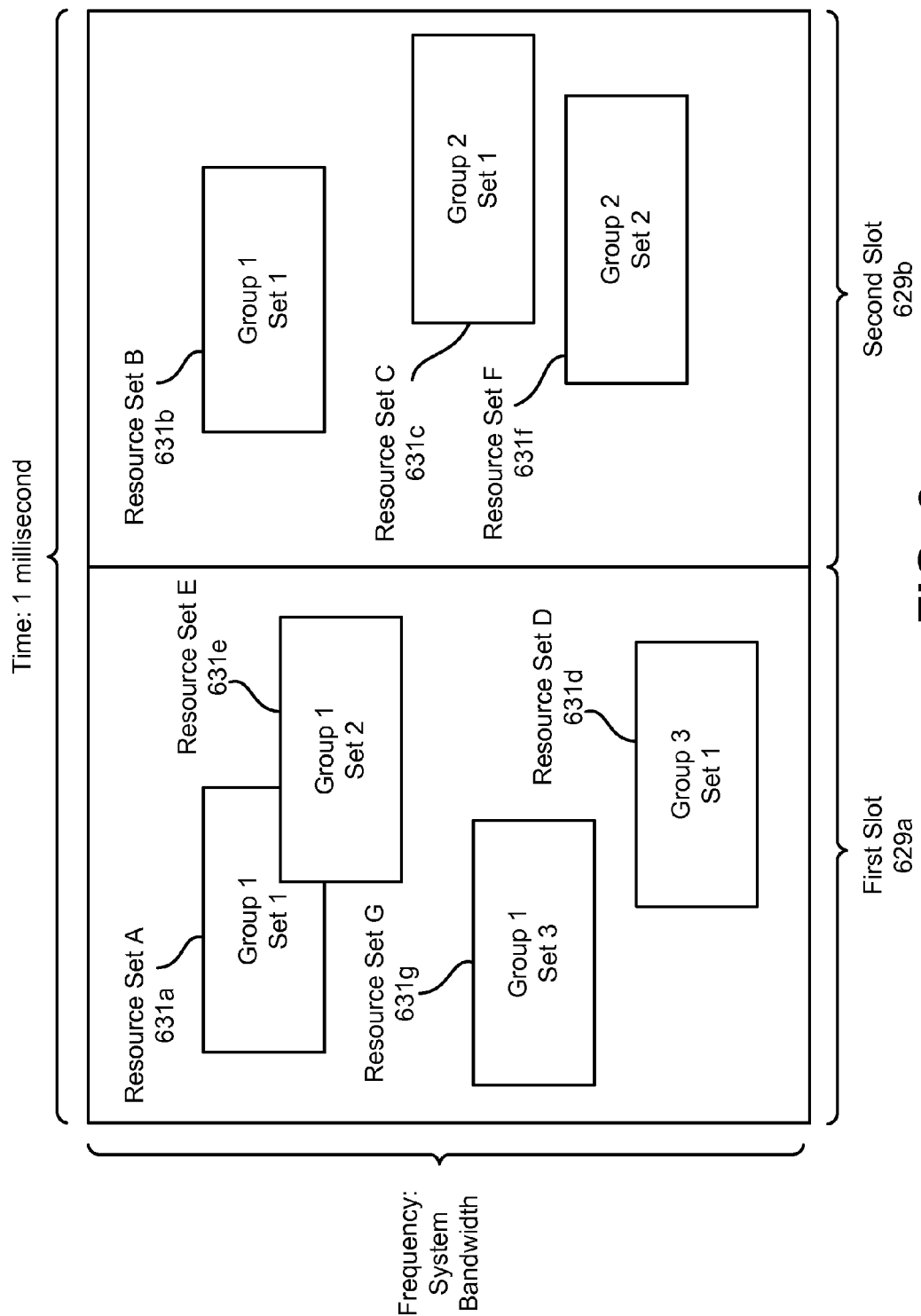
FIG. 6 is a block diagram illustrating an example of Enhanced Physical Hybrid-Automatic Repeat reQuest (ARQ) Indicator Channel (EPHICH) group sets.

FIG. 6 is a block diagram illustrating an example of EPHICH group sets. As described above in connection with FIG. 1, an EPHICH may carry HARQ-ACK information corresponding to a PUSCH transmission. Multiple EPHICHs constitute an EPHICH group. For example, multiple EPHICHs mapped to the same set of resource elements may constitute an EPHICH group. EPHICH time and/or frequency resources may be partitioned (by an eNB 160) in several non-overlapping groups. EPHICH groups may be further associated with one or more EPHICH group sets. The EPHICH group sets may be overlapping (e.g., multiple EPHICH group sets may include one or more of the same EPHICH groups).

The EPHICH group sets may utilize different EPHICH time and frequency resources as depicted in FIG. 6. For example, an EPHICH group may be associated with one or more resource sets 631a-g. A resource set 631 may include one or more resource elements (e.g., units of time-frequency resources). The time and frequency resources may correspond to a radio subframe. The subframe may span one millisecond. The time resources may be divided into two slots 629.

In one example of an EPHICH group set, Set 1 includes three EPHICH groups. Group 1 of Set 1 includes resource set A 631a and resource set B 631b. Resource set A 631a is in the first slot 629a and resource set B 631b is in the second slot 629b. Group 1 of Set 1 is non-contiguous. A non-contiguous group may be separated by one or more resources elements and/or may be in different slots. For example, Group 1 of Set 1 is non-contiguous since part of the resources is in the first slot and part of it in the second slot and some resource elements separate the two groups. Group 3 of Set 1 is an example of a contiguous resource. Group 2 of Set 1 is associated with resource set C 631c in the second slot 629b. Group 3 of Set 1 is associated with resource set D 631d in the first slot 629a. It should be noted that the EPHICH groups of Set 1 may use different time and frequency resources, but are associated with the same EPHICH group set 631.

In another example of an EPHICH group set, Set 2 includes two EPHICH groups. Group 1 of Set 2 is associated with resource set E 631e in the first time slot 629a. Group 2 of Set 2 is associated with resource set F 631f in the second slot 629b. It should be noted that Group 1 of Set 2 overlaps Group 1 of Set 1 (e.g., Set 1 and Set 2 overlap). In other words, resource set A 631a overlaps resource set E 631e. However, EPHICH groups in the same EPHICH group set may not overlap. Therefore, multiple EPHICH group sets may include one or more of the same EPHICHs.

In yet another example of an EPHICH group set, Set 3 includes one EPHICH group. Group 1 of Set 3 is associated with resource set G 631g in the first slot 629a. Set 3 illustrates that an EPHICH group set may include one EPHICH group.

The EPHICH groups and EPHICH group sets may be indicated through a combination of configuration parameters 126, 194. This may be accomplished as described above in connection with FIG. 1.

Figure 7:
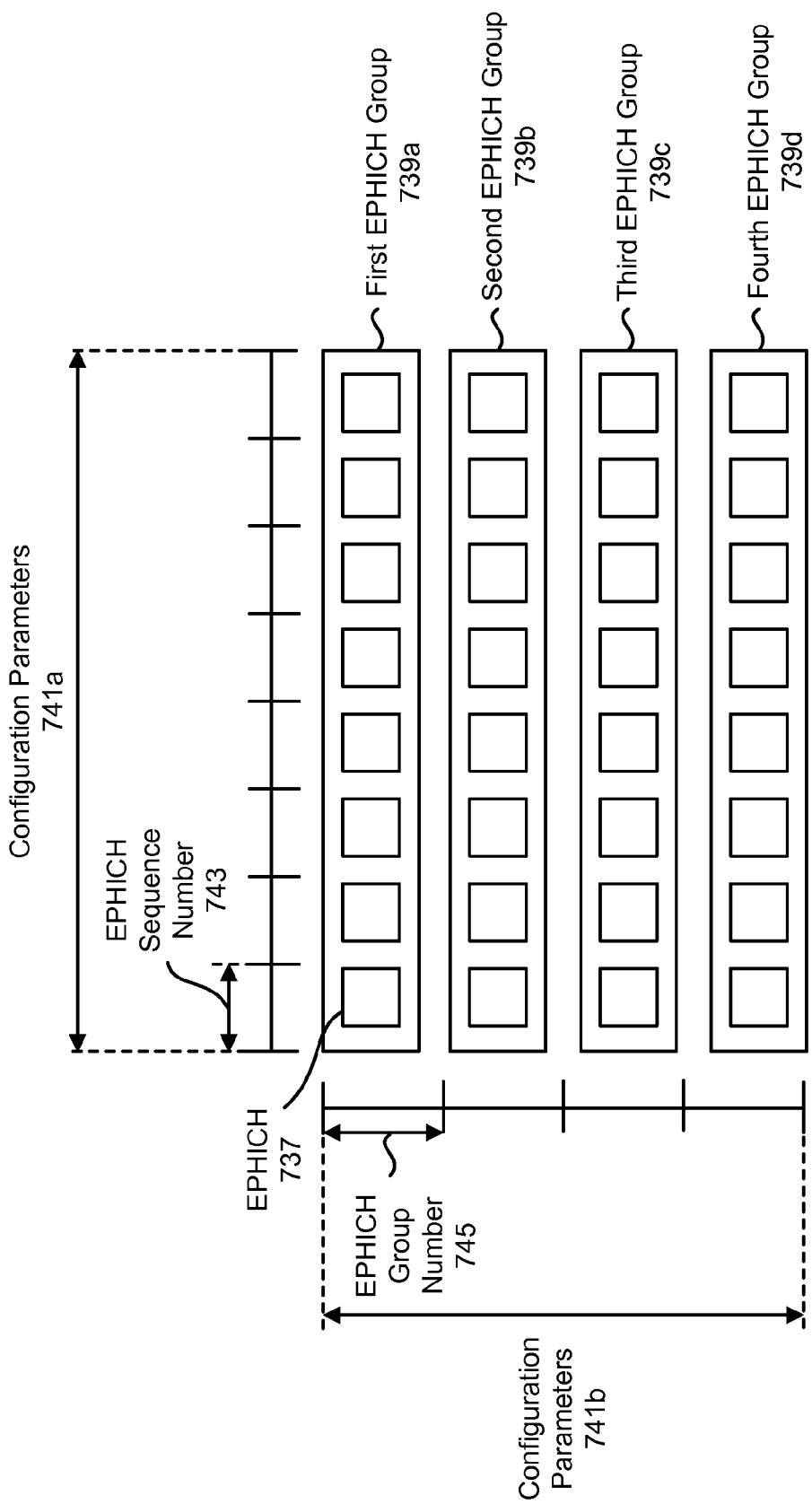
FIG. 7 is a block diagram illustrating one implementation of EPHICH group signaling.

FIG. 7 is a block diagram illustrating one implementation of EPHICH group 739 signaling. In this implementation, four EPHICH groups 739a-d may each include eight EPHICHs 737. Multiple EPHICHs 737 may be multiplexed in one EPHICH group 739 and each EPHICH 737 may use an EPHICH sequence that is orthogonal to the sequences used by other EPHICHs 737 in the same EPHICH group 739. The EPHICH sequence may spread the EPHICH 737 over all or some of the time and/or frequency resources of an EPHICH group 739.

A particular EPHICH 737 may be indicated by an index pair that may include an EPHICH sequence number 743 (e.g., the EPHICH sequence index) and an EPHICH group number 745 (e.g., the EPHICH group index). Different combinations of configuration parameters 741a-b may indicate the EPHICH sequence number 743 and the EPHICH group number 745. For example, the EPHICH sequence number 743 and the EPHICH group number 745 may be indicated through different combinations of a PUSCH PRB number, cyclic shift of the DMRS and/or an nDMRS parameter. In one implementation, the lowest PRB index of the PUSCH may indicate the EPHICH group number 745. Other configuration parameters 741 may also be used to generate the EPHICH sequence number 743 and the EPHICH group number 745. In one implementation, the EPHICH groups 739a-d may be indicated through a combination of configuration parameters 126, 194 as described above in connection with FIG. 1.

In one implementation, the EPHICH sequence number 743 and an EPHICH group number 745 may be generated by an eNB 160. The EPHICH sequence number 743 and an EPHICH group number 745 may be signaled by sending a configuration signal 123 and/or an EPHICH resource indicator 107 to the UE 102.

Figure 8:
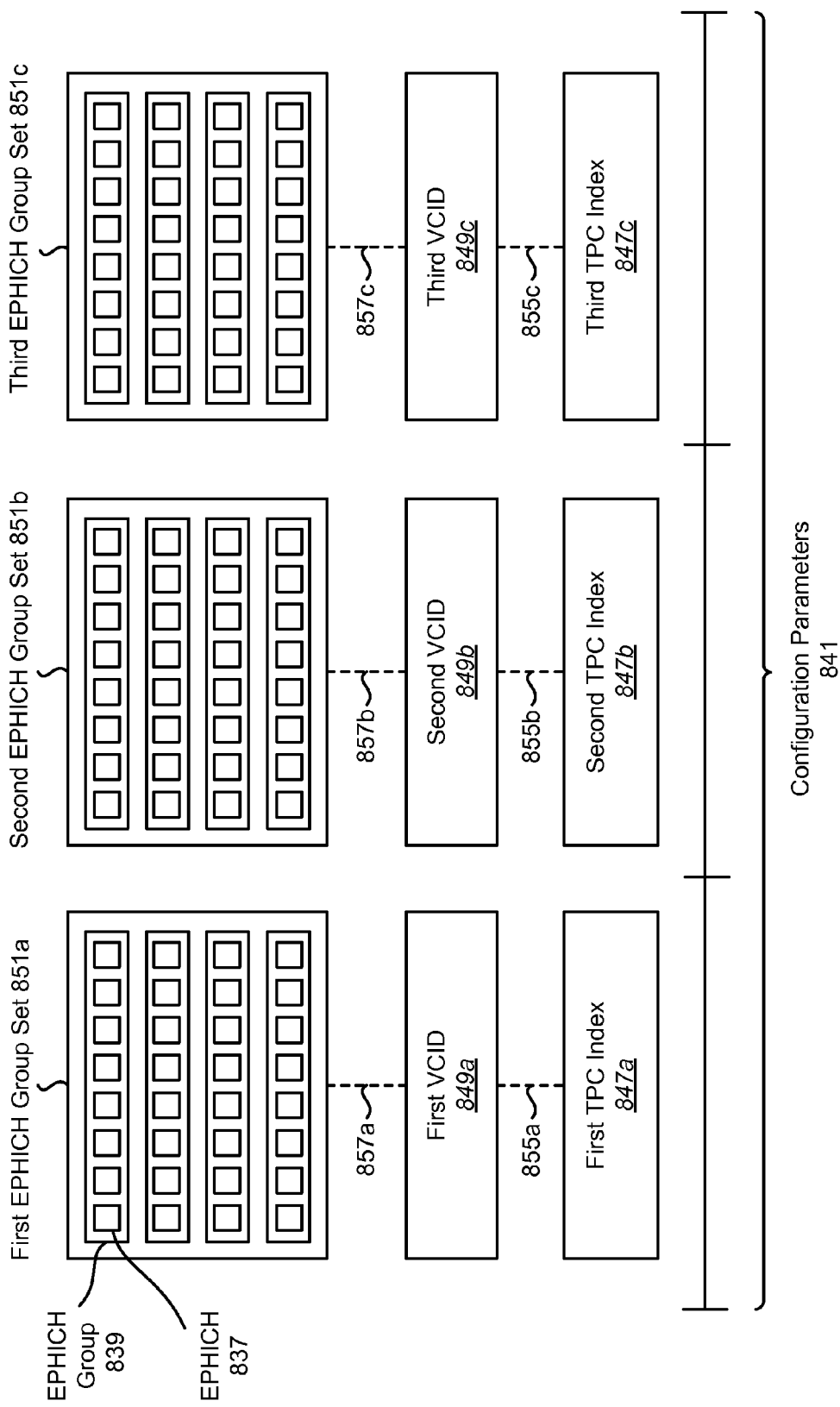
FIG. 8 is a block diagram illustrating one implementation of signaling a Transmit Power Control (TPC) index, virtual cell ID (VCID) and EPHICH group set.

FIG. 8 is a block diagram illustrating one implementation of signaling a transmit power control (TPC) index 847, VCID 849 and EPHICH group set 851. In this implementation, a TPC index 847 may be signaled. Furthermore, a VCID 849 and an EPHICH group set 851 may be determined based on linkages 855, 857. For example, multiple TPC indexes 847a-c, VCIDs 849a-c and EPHICH group sets 851a-c are configured. The VCIDs 849 may be used for generating PUSCH DMRS as described above in connection with FIG. 1. The EPHICH group set 851 may include one or more EPHICHs 837 and one or more EPHICH groups 839.

The TPC indexes 847, VCIDs 849 and EPHICH group sets 851 may be associated through linkages 855a-c and 857a-c. For example, the first TPC index 847a and the first VCID 849a may be associated with a first linkage 855a. The first VCID 849*a* and the first EPHICH group set 851*a* may be associated with a second linkage 857*a*. In one implementation, the TPC indexes 847, VCIDs 849, EPHICH group sets 851 and linkages 855, 857 may be indicated through a combination of configuration parameters 126, 194 as described above in connection with FIG. 1.

In this implementation, a TPC index 847 may be indicated based on configuration parameters 841. The configuration parameters 841 may be determined by an eNB 160 and sent to a UE 102 via a configuration signal 123, an EPHICH resource indicator 107 or a combination of the configuration signal 123 and EPHICH resource indicator 107. For example, the DCI bits of the EPHICH resource indicator 107 may dynamically select the TPS index 847.

Upon determining the indicated TPC index 847, the associated VCID 849 and EPHICH group set 851 may be determined based on the linkages 855, 857. For example, if the first TPC index 847*a* is indicated by the configuration parameters 841, the first VCID 849*a* is indicated by the first linkage 855*a* and the first EPHICH group set 851*a* is indicated by the second linkage 857*a*.

Figure 9:
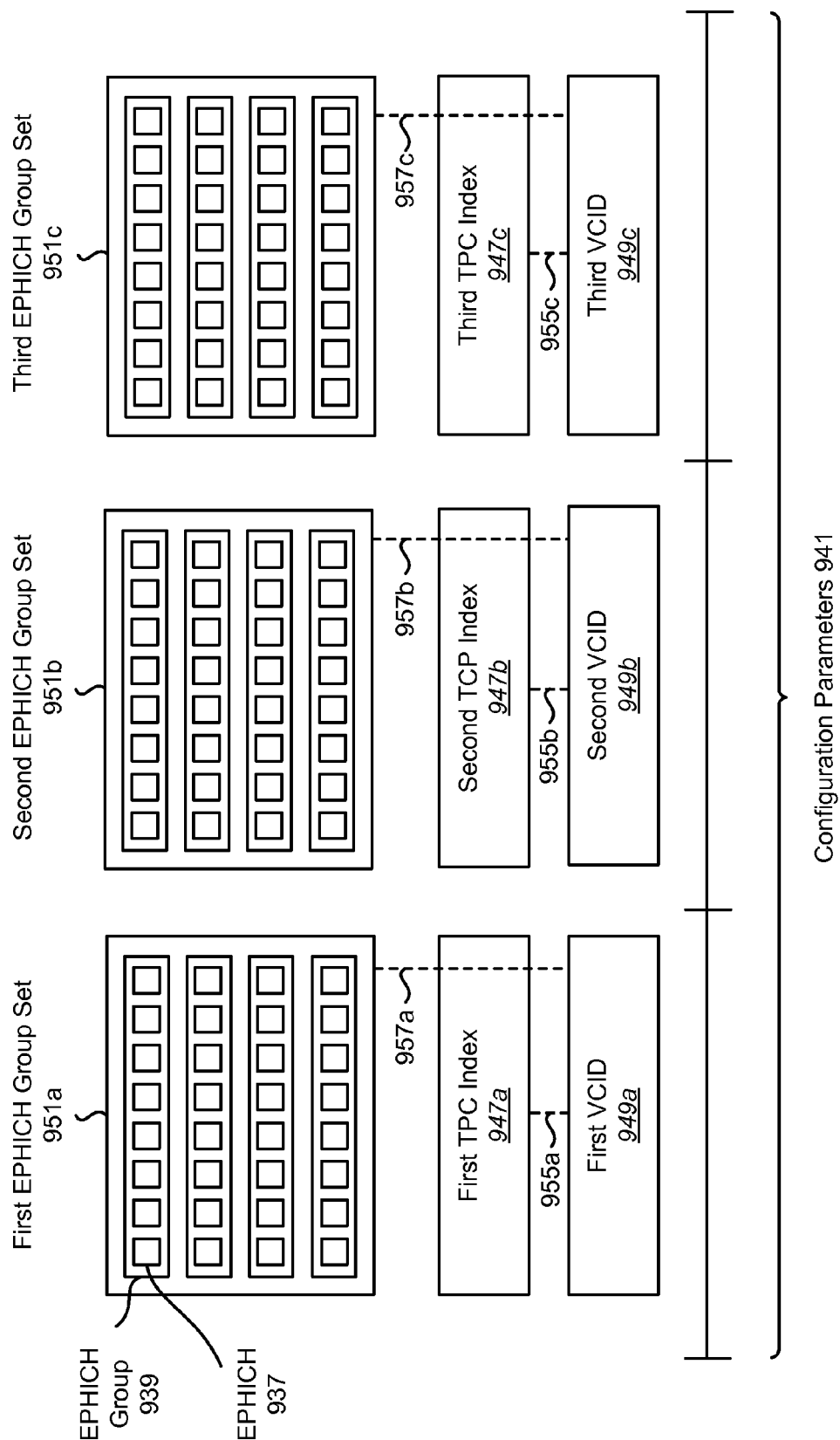
FIG. 9 is a block diagram illustrating another implementation of signaling a TPC index, VCID and EPHICH group set.

FIG. 9 is a block diagram illustrating another implementation of signaling a TPC index 947, VCID 949 and EPHICH group set 951. In this implementation, a VCID 949 may be signaled and a TPC index 947 and an EPHICH group set 951 may be determined based on linkages 955, 957. For example, multiple TPC indexes 947*a-c*, VCIDs 949*a-c* and EPHICH group sets 951*a-c* are configured. The EPHICH group set 951 may include one or more EPHICHs 937 and one or more EPHICH groups 939.

The TPC indexes 947, VCIDs 949 and EPHICH group sets 951 may be associated through linkages 955*a-c*, 957*a-c*. For example, the first VCID 949*a* and the first TPC index 947*a* may be associated with a first linkage 955*a*. The first VCID 949*a* and the first EPHICH group set 951*a* may be associated with a second linkage 957*a*. In one implementation, the TPC indexes 947, VCIDs 949, EPHICH group sets 951 and linkages 955, 957 may be indicated through a combination of configuration parameters 126, 194 as described above in connection with FIG. 1.

In this implementation, a VCID 949*a* may be indicated based on configuration parameters 941. The configuration parameters 941 may be determined by an eNB 160 and sent to a UE 102 via a configuration signal 123, an EPHICH resource indicator 107 or a combination of the configuration signal 123 and EPHICH resource indicator 107. For example, the DCI bits of the EPHICH resource indicator 107 may dynamically select the VCID 949*a*.

Upon determining the indicated VCID 949, the associated TPC index 947 and EPHICH group set 951 may be determined based on the linkages 955, 957. For example, if the first VCID 949*a* is indicated by the configuration parameters 941, the first TPC index 947*a* is indicated by the first linkage 955*a* and the first EPHICH group set 951*a* is indicated by the second linkage 957*a*.

Figure 10:
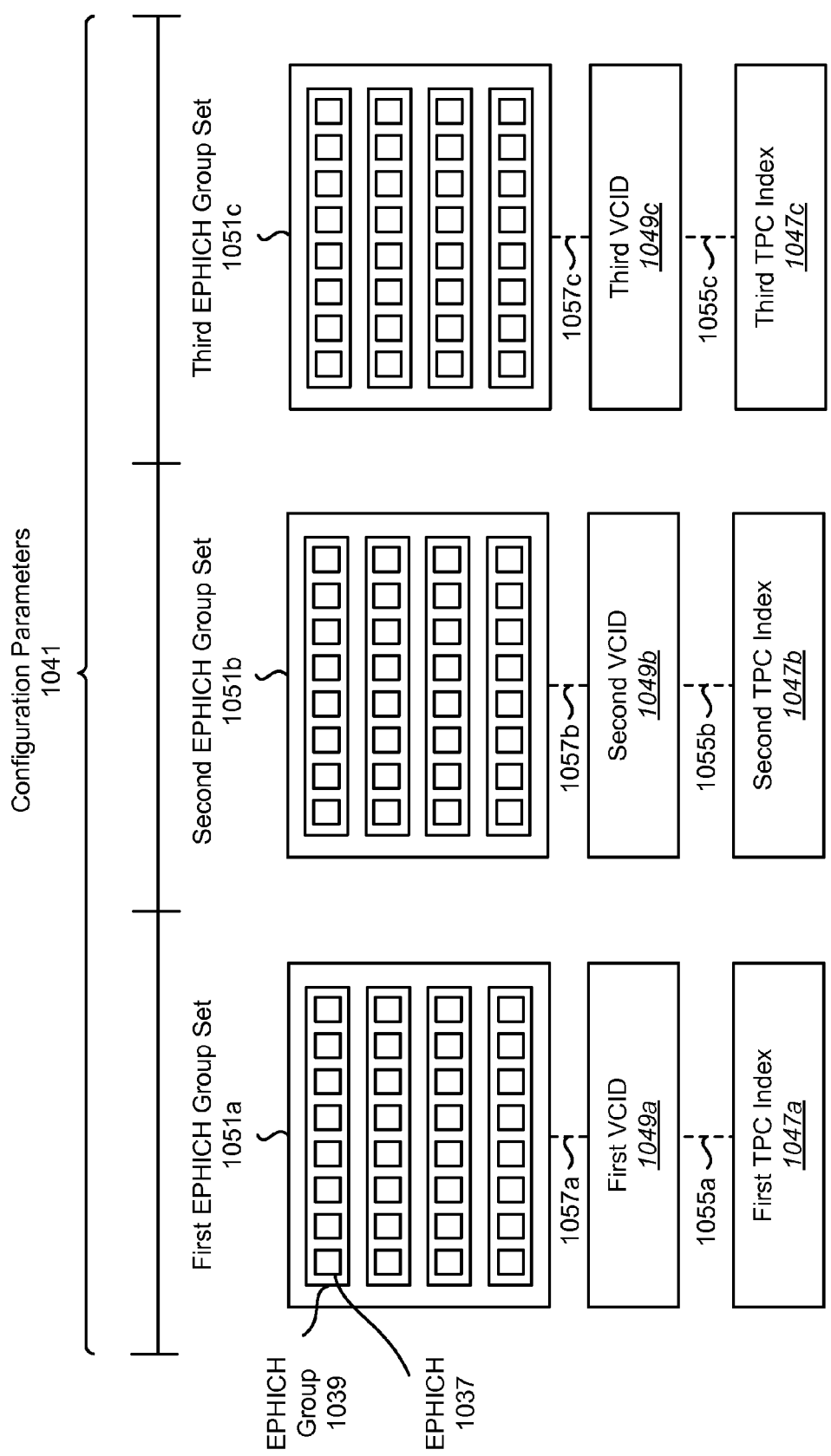
FIG. 10 is a block diagram illustrating yet another implementation of signaling a TPC index, VCID and EPHICH group set.

FIG. 10 is a block diagram illustrating yet another implementation of signaling a TPC index 1047, VCID 1049 and EPHICH group set 1051. In this implementation, an EPHICH group set 1051 may be signaled and a TPC index 1047 and a VCID 1049 may be determined based on linkages 1055, 1057. For example, multiple TPC indexes 1047*a-c*, VCIDs 1049*a-c* and EPHICH group sets 1051*a-c* are configured. The EPHICH group set 1051 may include one or more EPHICHs 1037 and one or more EPHICH groups 1039.

The TPC indexes 1047, VCIDs 1049 and EPHICH group sets 1051 may be associated through linkages 1055*a-c*, 1057*a-c*. For example, the first VCID 1049*a* and the first TPC index 1047*a* may be associated with a first linkage 1055*a*. The first VCID 1049*a* and the first EPHICH group set 1051*a* may be associated with a second linkage 1057*a*. In one implementation, the TPC indexes 1047, VCIDs 1049, EPHICH group sets 1051 and linkages 1055, 1057 may be indicated through a combination of configuration parameters 126, 194 as described above in connection with FIG. 1.

In this implementation, an EPHICH group set 1051 may be indicated based on configuration parameters 1041. The configuration parameters 1041 may be determined by an eNB 160 and sent to a UE 102 via a configuration signal 123, an EPHICH resource indicator 107 or a combination of the configuration signal 123 and EPHICH resource indicator 107. For example, the DCI bits of the EPHICH resource indicator 107 may dynamically select the EPHICH group set 1051.

Upon determining the indicated EPHICH group set 1051, the associated VCID 1049 and TPC index 1047 may be determined based on the linkages 1055, 1057. For example, if the first EPHICH group set 1051*a* is indicated by the configuration parameters 1041, the first TPC index 1047*a* is indicated by the first linkage 1055*a* and the first VCID 1049*a* is indicated by the second linkage 1057*a*.

Figure 11:
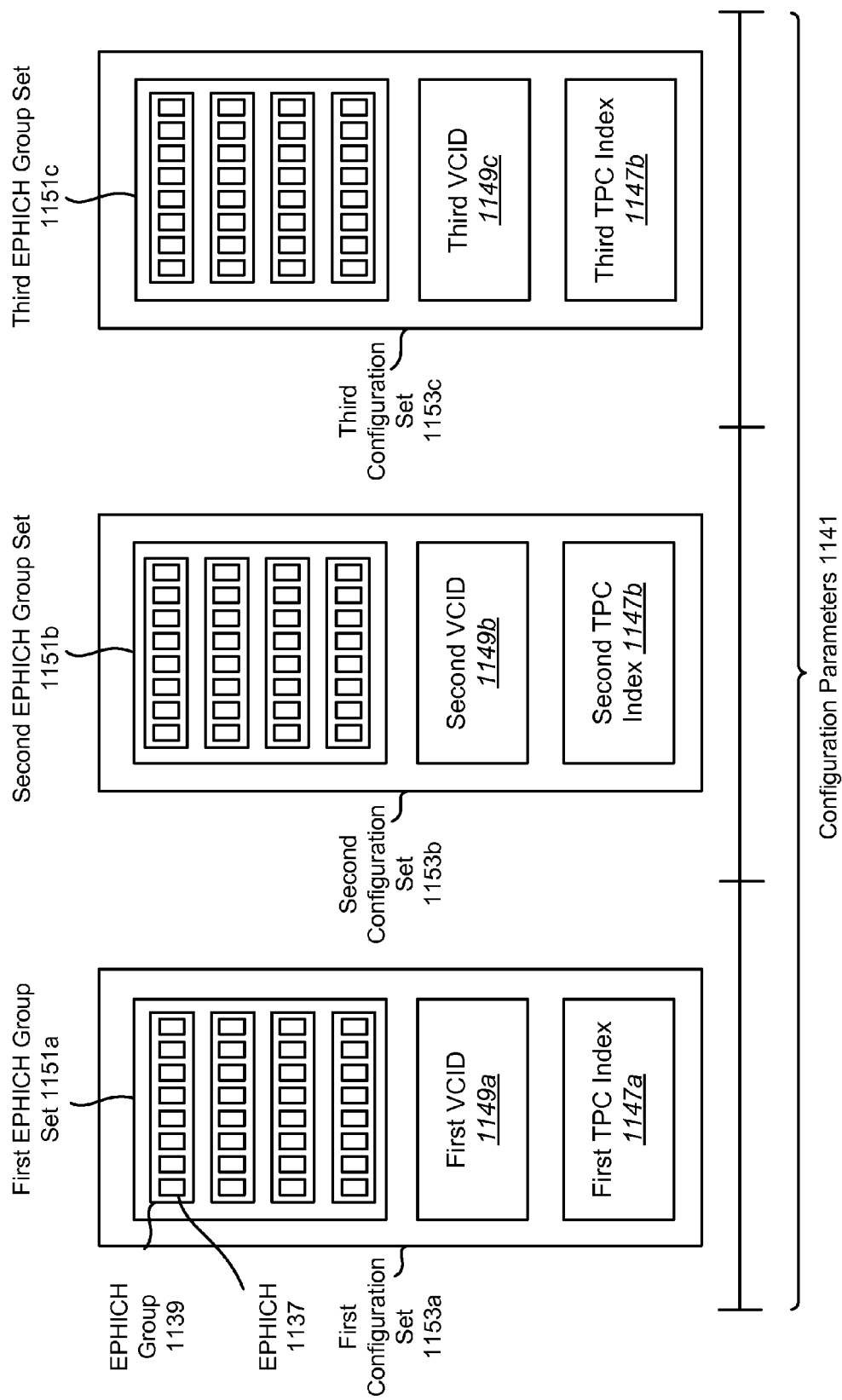
FIG. 11 is a block diagram illustrating one implementation of signaling a configuration set that may include at least one of a TPC index, VCID and EPHICH group set.

FIG. 11 is a block diagram illustrating one implementation of signaling a configuration set 1153 that may include at least one of a TPC index 1147, VCID 1149 and EPHICH group set 1151. In this implementation, multiple TPC indexes 1147*a-c*, VCIDs 1149*a-c* and EPHICH group sets 1151*a-c* are configured. An EPHICH group set 1151 may include one or more EPHICHs 1137 and one or more EPHICH groups 1139. A TPC index 1147, VCID 1149 and EPHICH group set 1151 may be associated with a configuration set 1153. In one implementation, the TPC indexes 1147, VCIDs 1149 and EPHICH group sets 1151 may be indicated through a combination of configuration parameters 126, 194 as described above in connection with FIG. 1.

In this implementation, a configuration set 1153 may be indicated based on configuration parameters 1141. The configuration parameters 1141 may be determined by an eNB 160 and sent to a UE 102 via a configuration signal 123, an EPHICH resource indicator 107 or a combination of the configuration signal 123 and EPHICH resource indicator 107. For example, the DCI bits of the EPHICH resource indicator 107 may dynamically select the configuration set 1153.

Upon determining the indicated configuration set 1153, the associated TPC index 1147, VCID 1149 and EPHICH group set 1151 may be determined. For example, one of the configuration sets 1153*a-c* may be signaled by the configuration parameters 1141. If the first configuration set 1153*a* is indicated by the configuration parameters 1141, the first TPC index 1147*a*, the first VCID 1149*a* and the first EPHICH group set 1151*a* are also indicated based on their association with the first configuration set 1153*a*.

Figure 12:
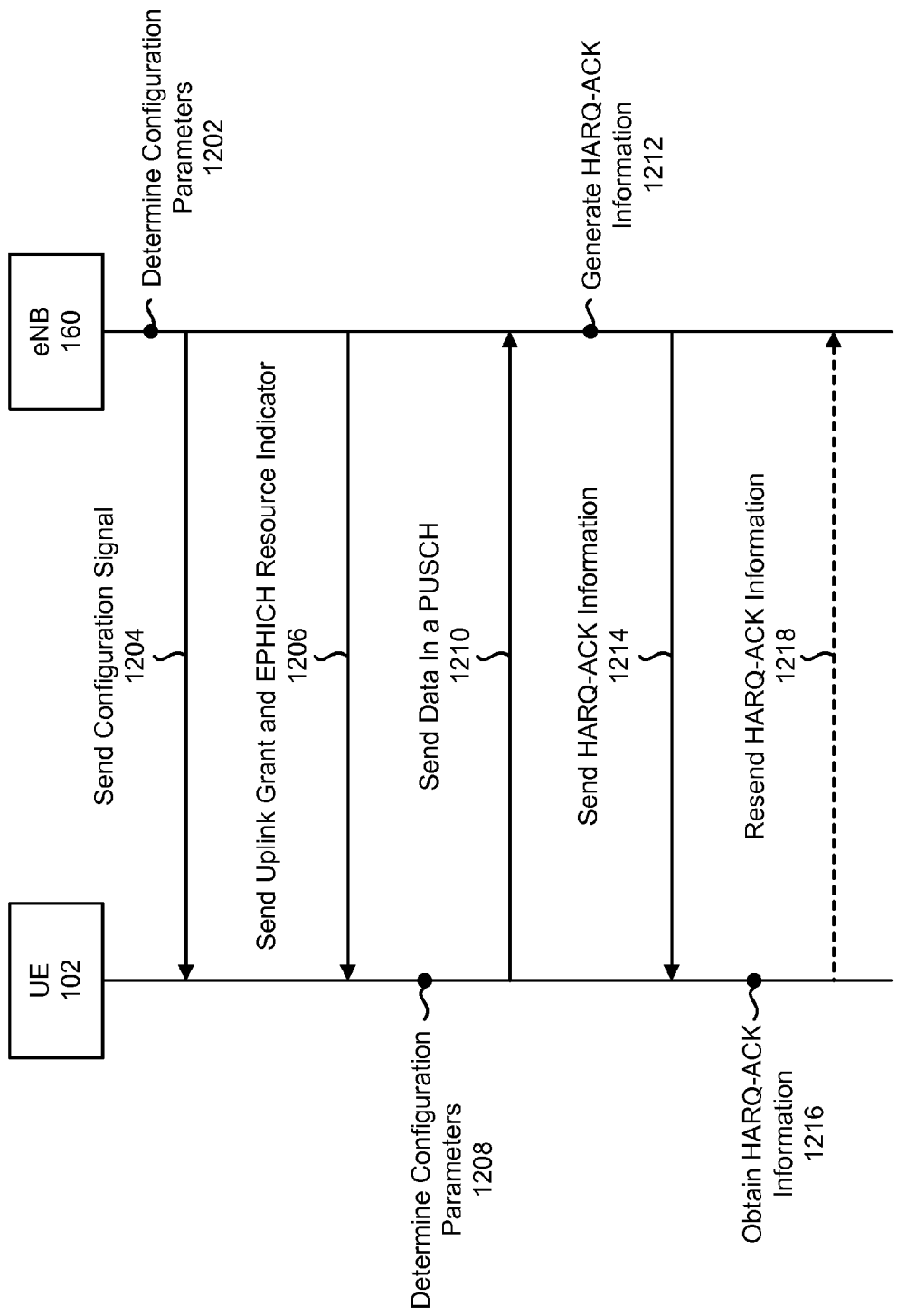
FIG. 12 is a thread diagram illustrating one example of EPHICH resource signaling by an eNB and a UE.

FIG. 12 is a thread diagram illustrating one example of EPHICH resource signaling by an eNB 160 and a UE 102. The eNB 160 and the UE 102 illustrated in FIG. 12 may be similar to the eNB 160 and UE 102 described above in connection with FIG. 1. The eNB 160 may determine 1202 configuration parameters 194 related to an EPHICH. This may be done as described above in connection with FIG. 2. The eNB 160 may send 1204 a configuration signal 123 to the UE 102 based on the configuration parameters 194. The configuration signal 123 may indicate the configuration of resources associated with at least one of an EPHICH, a VCID, a DMRS and a TPC.

The eNB 160 may also send 1206 an uplink grant and an associated EPHICH resource indicator 107 to the UE 102 based on the configuration parameters 194. This may be done as described above in connection with FIG. 4. The EPHICH resource indicator 107 may be sent 1206 at the same time as the configuration signal 123 or the EPHICH resource indicator 107 may be sent 1206 after the configuration signal 123.

Upon receiving the uplink grant and the associated EPHICH resource indicator 132, the UE 102 may determine 1208 configuration parameters 126 based on the EPHICH resource indicator 132. The configuration parameters 126 may indicate the resources used for an EPHICH. The configuration parameters 126 may include information about the time and frequency resources related to an EPHICH. For example, the configuration parameters 126 may include one or more EPHICH groups with associated EPHICH group indexes. The configuration parameters 126 may also include one or more EPHICH group sets with associated EPHICH group set indexes. Additionally, the configuration parameters 126 may include a first VCID for generating the base sequence for DMRS for a PUSCH transmission, a second VCID for generating the cyclic shift for DMRS for a PUSCH transmission, one or more TPC parameters and a TPC index as described above in connection with FIG. 1.

The UE 102 may send 1210 data in a PUSCH. The UE 102 may send 1210 the data to the eNB 160 based on the uplink grant received from the eNB 160. For example, the UE 102 may include one or more codewords in the PUSCH transmission that may be used by the eNB 160 for generating 1212 HARQ-ACK information.

Upon receiving the PUSCH transmission from the UE 102, the eNB 160 may generate 1212 the HARQ-ACK information. For example, the eNB 160 may generate 1212 an acknowledgement (ACK) bit for each packet that is correctly received in the PUSCH transmission. However, the eNB 160 may generate 1212 a negative acknowledgement (NACK) bit for each packet that is not correctly received in the PUSCH transmission.

Upon generating 1212 the HARQ-ACK information, the eNB 160 may send 1214 the HARQ-ACK information based on the configuration parameters 194. For example, the eNB 160 may send 1214 the HARQ-ACK information to the UE 102 using the resources indicated by the EPHICH resource indicator 107 (and/or the configuration signal 123). The HARQ-ACK information may be included in an EPHICH. One or more EPHICHs may be sent 1214 to the UE 102 corresponding to each codeword received in the PUSCH transmission from the UE 102. The one or more EPHICHs may be included in an EPHICH group. The one or more EPHICH groups may be included in an EPHICH group set.

Upon receiving the HARQ-ACK information from the eNB 160, the UE 102 may obtain 1216 HARQ-ACK information based on the configuration parameters 126. For example, the configuration parameters 126 may indicate the resources used for the EPHICH transmission. Using these resources, the UE 102 may receive one or more EPHICHs. The UE 102 may accordingly decode the information included in the one or more EPHICHs based on the resources that are indicated in the configuration parameters 126 to obtain 1216 the HARQ-ACK information. The HARQ-ACK information may indicate whether the data sent by the UE 102 in the PUSCH transmission was successfully received by the eNB 160 or not. The UE 102 may resend 1218 the data in another PUSCH transmission if the HARQ-ACK information indicates that the data was not successfully received by the eNB 160.

It should be noted that in the flow of messages depicted in FIG. 12, there may be at least k milliseconds roundtrip time. In an FDD configuration, k is normally four milliseconds. If the UE 102 receives an uplink grant in subframe n, the UE 102 is scheduled to transmit PUSCH in subframe n+k. The eNB 160 may provide an EPHICH with HARQ-ACK information for the PUSCH transmission. If the UE 102 transmits multiple codewords in the PUSCH transmission, multiple EPHICHs may be provided to the UE 102. Once the UE 102 transmits PUSCH in subframe n+k, the UE 102 monitors for an uplink grant and/or an EPHICH in subframe n+k+k. Therefore, the EPHICH resource indicator 107 (e.g., the DCI corresponding to the uplink grant) may be sent 1206 in advance of the sending 1214 the EPHICH (with the HARQ-ACK information). FIG. 12 is one example of a UL transmission procedure, but there are several variations which are not shown.

Figure 13:
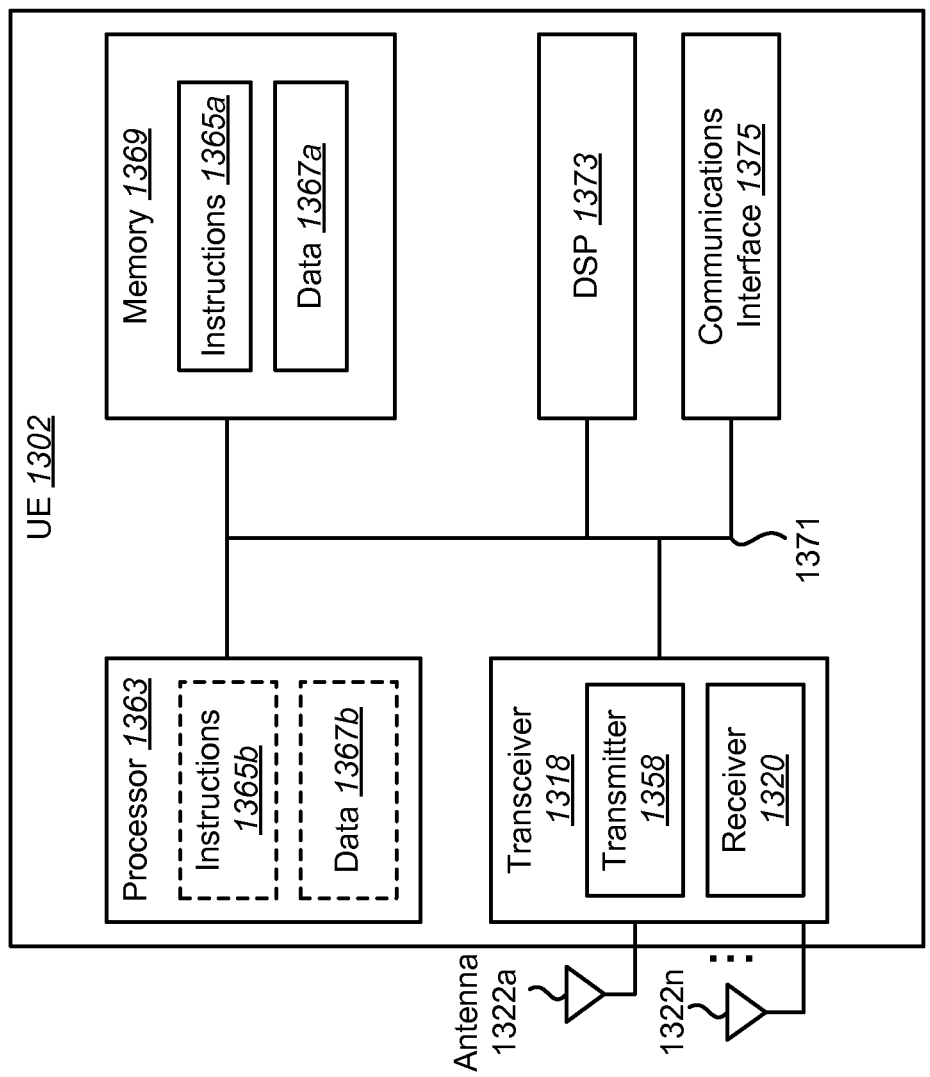
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1363 that controls operation of the UE 1302. The processor 1363 may also be referred to as a central processing unit (CPU). Memory 1369, which may include read-only memory (ROM), random access memory (RAM), a combination of the two or any type of device that may store information, provides instructions 1365a and data 1367a to the processor 1363. A portion of the memory 1369 may also include non-volatile random access memory (NVRAM). Instructions 1365b and data 1367b may also reside in the processor 1363. Instructions 1365b and/or data 1367b loaded into the processor 1363 may also include instructions 1365a and/or data 1367a from memory 1369 that were loaded for execution or processing by the processor 1363. The instructions 1365b may be executed by the processor 1363 to implement one or more of the methods 300, 500 described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1371, which may include a power bus, a control signal bus and a status signal bus, in addition to a data bus. However, for the sake of clarity, the various buses are illustrated in FIG. 13 as the bus system 1371. The UE 1302 may also include a digital signal processor (DSP) 1373 for use in processing signals. The UE 1302 may also include a communications interface 1375 that provides user access to the functions of the UE 1302. The UE 1302 illustrated in FIG. 13 is a functional block diagram rather than a listing of specific components.

Figure 14:
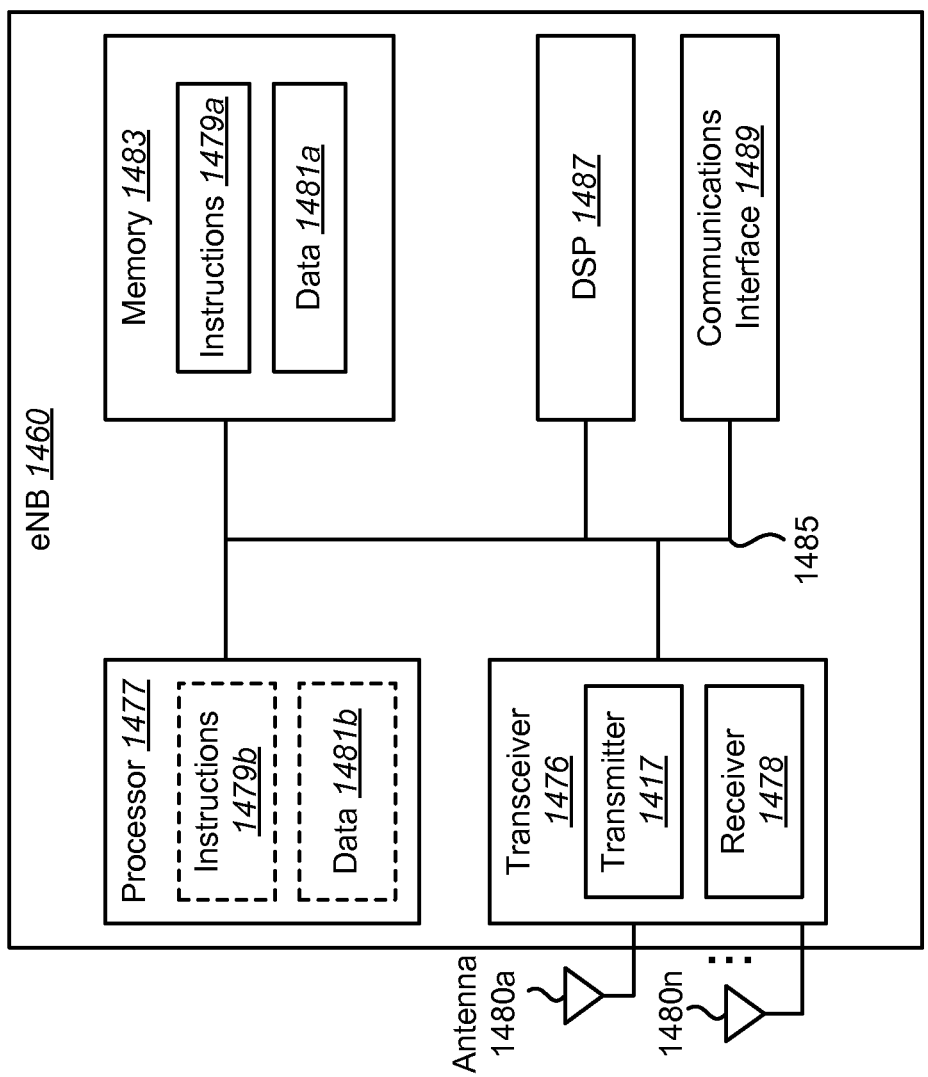
FIG. 14 illustrates various components that may be utilized in an eNB.

FIG. 14 illustrates various components that may be utilized in an eNB 1460. The eNB 1460 described in connection with FIG. 14 may be implemented in accordance with the eNB 160 described in connection with FIG. 1. The eNB 1460 includes a processor 1477 that controls operation of the eNB 1460. The processor 1477 may also be referred to as a central processing unit (CPU). Memory 1483, which may include read-only memory (ROM), random access memory (RAM), a combination of the two or any type of device that may store information, provides instructions 1479a and data 1481a to the processor 1477. A portion of the memory 1483 may also include non-volatile random access memory (NVRAM). Instructions 1479b and data 1481b may also reside in the processor 1477. Instructions 1479b and/or data 1481b loaded into the processor 1477 may also include instructions 1479a and/or data 1481a from memory 1483 that were loaded for execution or processing by the processor 1477. The instructions 1479*b* may be executed by the processor 1477 to implement one or more of the methods 200, 400 described above.

The eNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480*a-n* are attached to the housing and electrically coupled to the transceiver 1476.

The various components of the eNB 1460 are coupled together by a bus system 1485, which may include a power bus, a control signal bus and a status signal bus, in addition to a data bus. However, for the sake of clarity, the various buses are illustrated in FIG. 14 as the bus system 1485. The eNB 1460 may also include a digital signal processor (DSP) 1487 for use in processing signals. The eNB 1460 may also include a communications interface 1489 that provides user access to the functions of the eNB 1460. The eNB 1460 illustrated in FIG. 14 is a functional block diagram rather than a listing of specific components.

Figure 15:
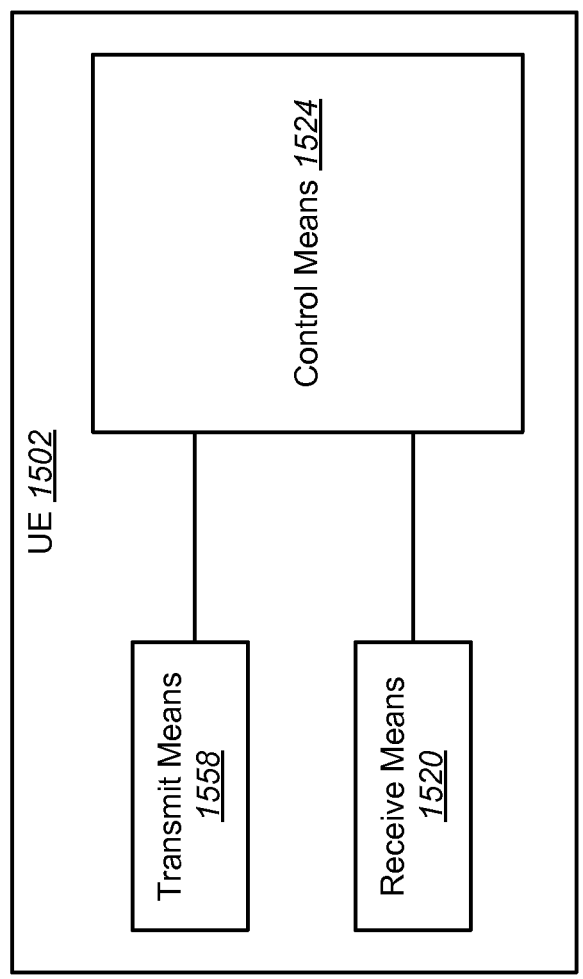
FIG. 15 is a block diagram illustrating one configuration of a UE in which systems and methods for sending feedback information may be implemented.

FIG. 15 is a block diagram illustrating one configuration of a UE 1502 in which systems and methods for sending feedback information may be implemented. The UE 1502 includes transmit means 1558, receive means 1520 and control means 1524. The transmit means 1558, receive means 1520 and control means 1524 may be configured to perform one or more of the functions described in connection with FIG. 3 and FIG. 13 above. FIG. 13 above illustrates one example of a concrete apparatus structure of FIG. 15. Other various structures may be implemented to realize one or more of the functions of FIG. 3, FIG. 5 and FIG. 13. For example, a DSP may be realized by software.

Figure 16:
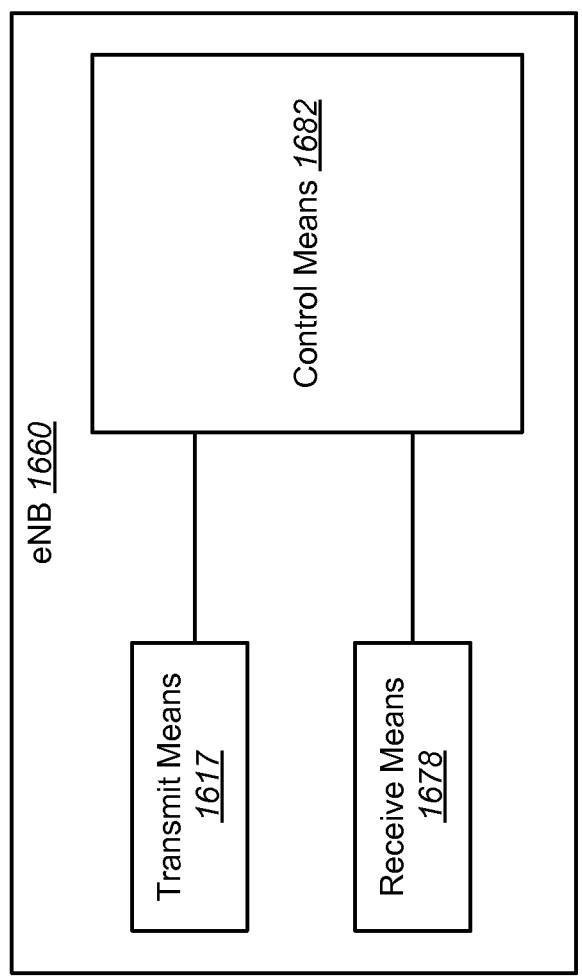
FIG. 16 is a block diagram illustrating one configuration of an eNB in which systems and methods for receiving feedback information may be implemented.

FIG. 16 is a block diagram illustrating one configuration of an eNB 1660 in which systems and methods for receiving feedback information may be implemented. The eNB 1660 includes transmit means 1617, receive means 1678 and control means 1682. The transmit means 1617, receive means 1678 and control means 1682 may be configured to perform one or more of the functions described in connection with FIG. 2 FIG. 14 above. FIG. 14 above illustrates one example of a concrete apparatus structure of FIG. 16. Other various structures may be implemented to realize one or more of the functions of FIG. 2, FIG. 4 and FIG. 14. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. An evolved Node B (eNB) for sending feedback information, comprising:
a processor;
memory in electronic communication with the processor, wherein instructions stored in the memory are executable to:
determine configuration parameters related to an Enhanced Physical Hybrid-Automatic Repeat reQuest (ARQ) Indicator Channel (EPHICH);
send an uplink grant and an associated EPHICH resource indicator based on the configuration parameters, wherein a transmit power control (TPC) index is determined based on the EPHICH resource indicator;
receive data in a Physical Uplink Shared Channel (PUSCH); and
send Hybrid Automatic Repeat Request Acknowledgement/Negative Acknowledgement (HARQ-ACK) information based on the configuration parameters.

2. The eNB of claim 1, wherein the EPHICH resource indicator comprises a field in downlink control information (DCI) corresponding to the uplink grant.

3. The eNB of claim 1, wherein an EPHICH group set index is determined based on the EPHICH resource indicator.

4. The eNB of claim 3, wherein at least one of a virtual cell ID (VCID) and the transmit power control (TPC) index are determined based on the EPHICH group set index.

5. The eNB of claim 1, wherein at least one of a virtual cell ID (VCID) and an EPHICH group set index are determined based on the TPC index.

6. The eNB of claim 1, wherein there are multiple virtual cell IDs (VCIDs) configured for demodulation reference signals (DMRS), and wherein a single VCID for generating a DMRS sequence is determined based on the EPHICH resource indicator.

7. The eNB of claim 6, wherein at least one of the transmit power control (TPC) index and an EPHICH group set index are determined based on the virtual cell ID (VCID).

8. The eNB of claim 1, wherein an EPHICH group index is determined based on the EPHICH resource indicator.

9. The eNB of claim 8, wherein the EPHICH resource indicator comprises at least one of a physical resource block (PRB) index and a cyclic shift index, and wherein the EPHICH group index is determined based on at least one of the PRB index and the cyclic shift index.

10. The eNB of claim 9, wherein a configuration set index is determined based on the EPHICH resource indicator.

11. A User Equipment (UE) for receiving feedback information, comprising:
a processor;
memory in electronic communication with the processor, wherein instructions stored in the memory are executable to:
receive an uplink grant and an associated Enhanced Physical Hybrid-Automatic Repeat reQuest (ARQ) Indicator Channel (EPHICH) resource indicator;
determine configuration parameters based on the EPHICH resource indicator, wherein an EPHICH group set index is determined based on the EPHICH resource indicator, and wherein at least one of a virtual cell ID (VCID) and a transmit power control (TPC) index are determined based on the EPHICH group set index;
send data in a Physical Uplink Shared Channel (PUSCH); and
obtain Hybrid Automatic Repeat Request Acknowledgement/Negative Acknowledgement (HARQ-ACK) information based on the configuration parameters.

12. The UE of claim 11, wherein the EPHICH resource indicator comprises a field in downlink control information (DCI) corresponding to the uplink grant.

13. The UE of claim 11, wherein an EPHICH group index is determined based on the EPHICH resource indicator.

14. A method for sending feedback information by an evolved Node B (eNB), comprising:
determining configuration parameters related to an Enhanced Physical Hybrid-Automatic Repeat reQuest (ARQ) Indicator Channel (EPHICH);
sending an uplink grant and an associated EPHICH resource indicator based on the configuration parameters, wherein a transmit power control (TPC) index is determined based on the EPHICH resource indicator;
receiving data in a Physical Uplink Shared Channel (PUSCH); and
sending Hybrid Automatic Repeat Request Acknowledgement/Negative Acknowledgement (HARQ-ACK) information based on the configuration parameters.

15. The method of claim 14, wherein the EPHICH resource indicator comprises a field in downlink control information (DCI) corresponding to the uplink grant.

16. The method of claim 14, wherein an EPHICH group set index is determined based on the EPHICH resource indicator.

17. The method of claim 16, wherein at least one of a virtual cell ID (VCID) and the transmit power control (TPC) index are determined based on the EPHICH group set index.

18. The method of claim 14, wherein at least one of a virtual cell ID (VCID) and an EPHICH group set index are determined based on the TPC index.

19. The method of claim 14, wherein there are multiple virtual cell IDs (VCIDs) configured for demodulation reference signals (DMRS), and wherein a single VCID for generating a DMRS sequence is determined based on the EPHICH resource indicator.

20. The method of claim 19, wherein at least one of the transmit power control (TPC) index and an EPHICH group set index are determined based on the VCID.

21. The method of claim 14, wherein an EPHICH group index is determined based on the EPHICH resource indicator.

22. The method of claim 21, wherein the EPHICH resource indicator comprises at least one of a physical resource block (PRB) index and a cyclic shift index, and wherein the EPHICH group index is determined based on at least one of the PRB index and the cyclic shift index.

23. The method of claim 22, wherein a configuration set index is determined based on the EPHICH resource indicator.

24. A method for receiving feedback information by a User Equipment (UE), comprising:
receiving an uplink grant and an associated Enhanced Physical Hybrid-Automatic Repeat reQuest (ARQ) Indicator Channel (EPHICH) resource indicator;
determining configuration parameters based on the EPHICH resource indicator, wherein an EPHICH group set index is determined based on the EPHICH resource indicator, and wherein at least one of a virtual cell ID (VCID) and a transmit power control (TPC) index are determined based on the EPHICH group set index;
sending data in a Physical Uplink Shared Channel (PUSCH); and
obtaining Hybrid Automatic Repeat Request Acknowledgement/Negative Acknowledgement (HARQ-ACK) information based on the configuration parameters.

25. The method of claim 24, wherein the EPHICH resource indicator comprises a field in downlink control information (DCI) corresponding to the uplink grant.

26. The method of claim 24, wherein an EPHICH group index is determined based on the EPHICH resource indicator.

* * * * *